(12) United States Patent
Aotani

(10) Patent No.: US 11,827,830 B2
(45) Date of Patent: Nov. 28, 2023

(54) DISPERSANT, CONDUCTIVE MATERIAL DISPERSION AND SLURRY FOR ELECTRODE FILM

(71) Applicants: TOYO INK SC HOLDINGS CO., LTD., Tokyo (JP); TOYOCOLOR CO., LTD., Tokyo (JP)

(72) Inventor: Yu Aotani, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 16/964,610

(22) PCT Filed: Apr. 10, 2020

(86) PCT No.: PCT/JP2020/016127
§ 371 (c)(1),
(2) Date: Jul. 24, 2020

(87) PCT Pub. No.: WO2021/152875
PCT Pub. Date: Aug. 5, 2021

(65) Prior Publication Data
US 2023/0250342 A1  Aug. 10, 2023

(30) Foreign Application Priority Data

Jan. 31, 2020 (JP) .................................. 2020-015256

(51) Int. Cl.
| | | |
|---|---|---|
| *C09K 23/52* | (2022.01) | |
| *C08F 236/12* | (2006.01) | |
| *C08L 9/02* | (2006.01) | |
| *H01M 4/62* | (2006.01) | |
| *H01M 4/13* | (2010.01) | |
| *C09K 23/22* | (2022.01) | |

(52) U.S. Cl.
CPC ............ *C09K 23/52* (2022.01); *C08F 236/12* (2013.01); *C08L 9/02* (2013.01); *C09K 23/22* (2022.01); *H01M 4/13* (2013.01); *H01M 4/622* (2013.01); *H01M 4/625* (2013.01); *C08L 2203/20* (2013.01)

(58) Field of Classification Search
CPC ........ H01M 4/625; H01M 4/13; H01M 4/622; C09K 23/25; C08F 236/12; C08L 9/02
See application file for complete search history.

(56) References Cited

U.S. PATENT DOCUMENTS

| | | |
|---|---|---|
| 10,033,042 B2 | 7/2018 | Fukumine et al. |
| 10,141,574 B2 | 11/2018 | Yoo et al. |
| 11,046,797 B2 | 6/2021 | Goto et al. |
| 2013/0330622 A1 | 12/2013 | Sasaki |

FOREIGN PATENT DOCUMENTS

| | | |
|---|---|---|
| CN | 103384932 | 11/2013 |
| CN | 108780894 | 11/2018 |
| CN | 110383546 | 10/2019 |
| EP | 2822067 | 1/2015 |
| EP | 3348582 | 7/2018 |
| EP | 3598544 | 1/2020 |
| JP | 2005162877 | 6/2005 |
| JP | 2011204573 | 10/2011 |
| JP | 2011210667 | 10/2011 |
| JP | 2013206759 | 10/2013 |
| JP | 2014193986 | 10/2014 |
| JP | 2015128012 | 7/2015 |
| JP | 2016065142 | 4/2016 |
| JP | 5955496 | 7/2016 |
| JP | 2018522803 | 8/2018 |
| JP | 2018200889 | 12/2018 |
| KR | 101831562 | 2/2018 |
| WO | 2017029813 | 2/2017 |

OTHER PUBLICATIONS

"Office Action of Japan Counterpart Application" with English translation thereof, dated Jul. 26, 2022, p. 1-p. 8.
"Second Office Action of China Counterpart Application", dated Feb. 18, 2023, with English translation thereof, p. 1-p. 6.
"Office Action of China Counterpart Application" with English translation thereof, dated Oct. 9, 2022, p. 1-p. 16.
"Office Action of Japan Counterpart Application" with English translation thereof, dated Oct. 4, 2022, p. 1-p. 8.
"Search Report of Europe Counterpart Application", dated Jun. 12, 2023, p. 1-p. 7.

*Primary Examiner* — Sarah A. Slifka
(74) *Attorney, Agent, or Firm* — JCIPRNET

(57) ABSTRACT

Provided is a dispersant containing a copolymer that includes an aliphatic hydrocarbon structural unit, a nitrile group-containing structural unit, and a substituted or unsubstituted carbamoyl group-containing structural unit. The aliphatic hydrocarbon structural unit includes an alkylene structural unit. The content of the aliphatic hydrocarbon structural unit is 40 mass % or more and less than 85 mass % based on the mass of the copolymer, the content of the nitrile group-containing structural unit is 15 mass % or more and 50 mass % or less based on the mass of the copolymer, and the content of the substituted or unsubstituted carbamoyl group-containing structural unit is 10 mass % or less based on the mass of the copolymer. The weight-average molecular weight of the polymer is 5,000 or more and 400,000 or less.

16 Claims, 4 Drawing Sheets

DISPERSANT, CONDUCTIVE MATERIAL DISPERSION AND SLURRY FOR ELECTRODE FILM

CROSS-REFERENCE TO RELATED APPLICATION

This application is a 371 application of the International PCT application serial no. PCT/JP2020/016127 filed on Apr. 10, 2020, which claims the priority benefits of Japan Patent Application No. 2020-015256, filed on Jan. 31, 2020. The entirety of each of the above-mentioned patent applications is hereby incorporated by reference herein and made a part of this specification.

BACKGROUND OF THE INVENTION

Technical Field

Embodiments of the present invention relate to a dispersant, a dispersant composition, a conductive material dispersion, a binder resin-containing conductive material dispersion, a slurry for electrode film, an electrode film, and a non-aqueous electrolyte secondary battery.

Related Art

Lithium-ion secondary batteries are widely used as batteries for electric vehicles, mobile devices and the like. As the performance of the electric vehicles and the mobile devices is advanced, a demand for a lithium-ion secondary battery having high capacity, high output, smaller size and lighter weight increases year after year.

Since the capacity of the lithium-ion secondary battery depends greatly on a positive electrode active material and a negative electrode active material which are the main materials, various materials used for these electrode active materials have been actively researched. However, when an electrode active material that has been put to practical use is used, the charging capacity has almost reached the theoretical value, and improvement has almost reached the limit. Thus, because the charging capacity can be simply increased when the filling amount of the electrode active materials in an electrode film is increased, attempts have been made to reduce the amounts of conductive materials and binder resins that do not directly contribute to the charging capacity.

The conductive material plays a role of forming a conductive path inside the electrode film or connecting particles of the electrode active materials. It is required that the conductive path or the connection is not easily cut due to expansion and contraction of the electrode film. In order to maintain the conductive path and the connection with a small addition amount, it is effective to use nanocarbon having a large specific surface area, especially carbon nanotubes (CNT), as the conductive material to form an efficient conductive network. However, because the nanocarbon having a large specific surface area has a high cohesive force, it is difficult to favorably disperse the nanocarbon in the slurry for electrode film and/or the electrode film.

In view of such a background, various methods have been proposed for producing a conductive material dispersion by using various dispersants and producing a slurry for electrode film through the conductive material dispersion (for example, refer to Patent literature 1 to 5).

LITERATURE OF PRIOR ART

Patent Literature

Patent literature 1: Japanese Patent Laid-Open No. 2005-162877
Patent literature 2: Japanese Patent Laid-Open No. 2014-193986
Patent literature 3: National Publication of International Patent Application No. 2018-522803
Patent literature 4: Japanese Patent Laid-Open No. 2015-128012
Patent literature 5: Korean Registered Patent No. 10-1831562

SUMMARY

Problems to be Solved

For example, in Patent literature 1 and Patent literature 2, it has been proposed to improve initial characteristics and the cycle life of a battery by using a polymer such as polyvinylpyrrolidone or polyvinyl alcohol as a dispersant and dispersing a conductive material in a solvent in advance. However, although the polyvinylpyrrolidone or polyvinyl alcohol can be used to produce a conductive material dispersion having a good dispersion state, the dispersion state becomes poor in the electrode film formation process, leading to deterioration in the conductivity.

In Patent literature 3 and Patent literature 4, a conductive material dispersion using a hydrogenated nitrile rubber as a dispersant has been proposed. However, these hydrogenated nitrile rubbers have poor dispersibility, and thus is insufficient to form a good conductive network. In addition, the viscosity is high, and thus a long time is required to produce the conductive material dispersion, or the conductive material dispersion becomes poor in fluidity and handleability, which makes it difficult to realize industrial application.

Patent literature 5 proposes a CNT dispersion in which the dispersibility is improved by adding aminoethanol or the like to the hydrogenated nitrile rubber. It is considered that in this CNT dispersion, the viscosity of the dispersion and the action of the dispersant are improved by changing the polarity of the solvent. However, it is still insufficient for forming a good conductive network.

The inventors have made intensive studies on a method of satisfactorily dispersing a conductive material in a conductive material dispersion and maintaining a good conductive network even in an electrode film, to improve the output and the cycle life of a battery with a small addition amount of the conductive material. As a result, the inventors found that in the method proposed in Patent literature 1 and Patent literature 2 described above, a conductive material dispersion having a good dispersion state can be reliably produced, whereas dispersion failure occurs when the conductive material dispersion is mixed with the electrode active materials for preparing the slurry for electrode film. Accordingly, a good conductive network cannot be formed in the electrode film, resulting in poor battery characteristics. The inventors call the phenomenon that dispersion failure occurs at the stage of preparing the slurry for electrode film as "robustness" failure. Robustness is a property capable of maintaining a good dispersion state.

In order to form a good conductive network in the electrode film and improve the output and the cycle life of the battery with a small addition amount of the conductive material, both good dispersibility at the stage of dispersing the conductive material in the conductive material dispersion and good robustness at the stage of preparing the slurry for electrode film are required.

Therefore, an embodiment of the present invention aims to provide a dispersant and a dispersant composition capable of producing a conductive material dispersion and a binder resin-containing conductive material dispersion capable of achieving both good dispersibility and good robustness. In addition, an embodiment of the present invention aims to provide a conductive material dispersion and a binder resin-containing conductive material dispersion capable of achieving both good dispersibility and good robustness. Moreover, an embodiment of the present invention aims to provide a slurry for electrode film having good dispersibility. Furthermore, an embodiment of the present invention aims to provide an electrode film capable of improving the output and the cycle life of a non-aqueous electrolyte secondary battery, and a non-aqueous electrolyte secondary battery having high output and good cycle life.

Means to Solve Problems

As a result of intensive studies by the inventors, by using a copolymer containing a specific structural unit in a specific ratio and having a specific molecular weight as a dispersant, the conductive material is satisfactorily dispersed in the solvent, and the good dispersion state of the conductive material is maintained even during the preparation of the slurry for electrode film and during the production of the electrode film, and accordingly a good conductive network can be formed in the electrode. Consequently, the rate characteristics and the cycle characteristics of the battery can be enhanced even with a small addition amount of the conductive material.

That is, the present invention includes the following embodiments. The embodiments of the present invention are not limited to the following.

(1) A dispersant containing a copolymer including an aliphatic hydrocarbon structural unit, a nitrile group-containing structural unit, and a substituted or unsubstituted carbamoyl group-containing structural unit, wherein the aliphatic hydrocarbon structural unit includes an alkylene structural unit, the content of the aliphatic hydrocarbon structural unit is 40 mass % or more and less than 85 mass % based on the mass of the copolymer, the content of the nitrile group-containing structural unit is 15 mass % or more and 50 mass % or less based on the mass of the copolymer, and the content of the substituted or unsubstituted carbamoyl group-containing structural unit is 10 mass % or less based on the mass of the copolymer, and the weight-average molecular weight of the copolymer is 5,000 or more and 400,000 or less.

(2) In the dispersant of (1), wherein the copolymer further includes a carboxyl group-containing structural unit of less than 1 mass % based on the mass of the copolymer.

(3) A dispersant composition containing the dispersant of (1) or (2), a base of 1 mass % or more and 20 mass % or less based on the mass of the copolymer, and a solvent.

(4) A conductive material dispersion containing the dispersant of (1) or (2) and a solvent, or containing the dispersant composition of (3) and a conductive material.

(5) A conductive material dispersion of (4) having a complex modulus of less than 20 Pa and a phase angle of 19° or more.

(6) A binder resin-containing conductive material dispersion containing a binder resin and a conductive material dispersion of (4) or (5).

(7) A slurry for electrode film containing a conductive material dispersion of (4) or (5) and an electrode active material, or containing the binder resin-containing conductive material dispersion of (6) and an electrode active material.

(8) An electrode film including at least one film selected form the group consisting of a film formed by using the conductive material dispersion of (4) or (5), a film formed by using the binder resin-containing conductive material dispersion of (6), and a film formed by using the slurry for electrode film of (7).

(9) A non-aqueous electrolyte secondary battery including a positive electrode, a negative electrode, and an electrolyte, wherein at least one electrode selected from the group consisting of the positive electrode and the negative electrode includes the electrode film of (8).

Effect

According to an embodiment of the present invention, a dispersant and a dispersant composition capable of producing a conductive material dispersion and a binder resin-containing conductive material dispersion that can achieve both excellent dispersibility and excellent robustness can be provided. In addition, according to an embodiment of the present invention, a conductive material dispersion and a binder resin-containing conductive material dispersion capable of achieving both excellent dispersibility and excellent robustness can be provided. Moreover, according to an embodiment of the present invention, a slurry for electrode film having excellent dispersibility can be provided. Furthermore, according to an embodiment of the present invention, an electrode film capable of improving the output and the cycle life of a non-aqueous electrolyte secondary battery, and a non-aqueous electrolyte secondary battery having high output and good cycle life can be provided.

DESCRIPTION OF THE EMBODIMENTS

Figure 1:
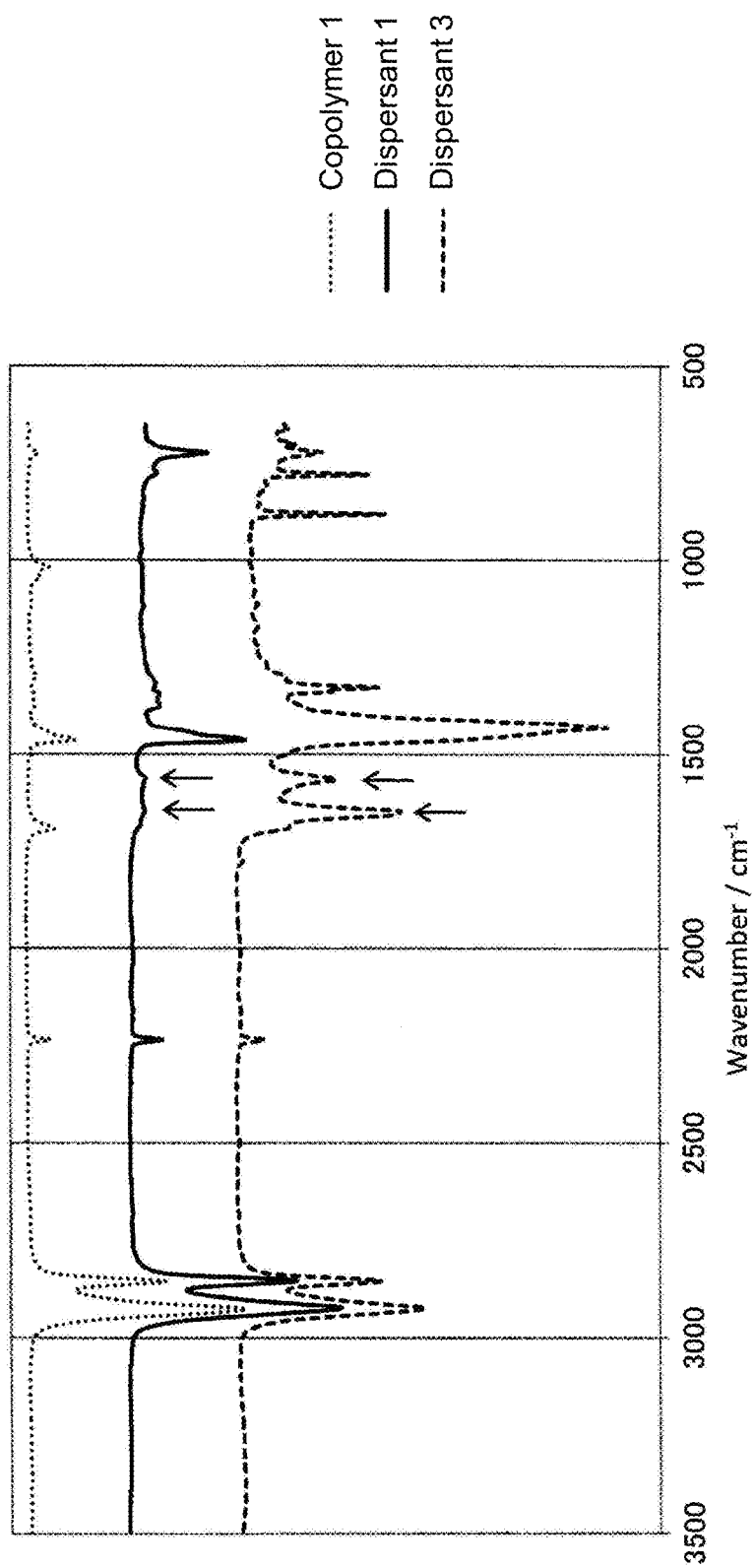
FIG. 1 is infrared spectra of Copolymer 1, Dispersant 1, and Dispersant 3 in an infrared spectroscopic analysis by attenuated total reflection.

Hereinafter, a dispersant, a conductive material dispersion, a binder resin-containing conductive material dispersion, a slurry for electrode film, an electrode film, and a non-aqueous electrolyte secondary battery according to the embodiments of the present invention are described in detail. The present invention is not limited to the following embodiments and also includes embodiments carried out within the scope in which the spirit is not changed.

<Dispersant>

The dispersant contains a copolymer including an aliphatic hydrocarbon structural unit, a nitrile group-containing unit, and a carbamoyl group-containing structural unit. The aliphatic hydrocarbon structural unit includes at least an alkylene structural unit. The content of the aliphatic hydrocarbon structural unit is 40 mass % or more and less than 85 mass % based on the mass of the copolymer. The content of the nitrile group-containing unit is 15 mass % or more and 50 mass % or less based on the mass of the copolymer. The content of the carbamoyl group-containing structural unit is 10 mass % or less based on the mass of the copolymer. The weight-average molecular weight of the copolymer is 5,000 or more and 400,000 or less. In the present specification, the copolymer may be referred to as "Copolymer I". In addition, in the present specification, the "substituted or unsubstituted carbamoyl group" (—CO—NR'$_2$ (R' is each independently a hydrogen atom or a substituent)) may be referred to as "amido group".

The aliphatic hydrocarbon structural unit is a structural unit including an aliphatic hydrocarbon structure and is preferably a structural unit only consisting of an aliphatic hydrocarbon structure. The aliphatic hydrocarbon structure includes at least a saturated aliphatic hydrocarbon structure and may further include an unsaturated aliphatic hydrocarbon structure. The aliphatic hydrocarbon structure preferably includes at least a linear aliphatic hydrocarbon structure and may further include a branched aliphatic hydrocarbon structure.

The aliphatic hydrocarbon structural unit may be, for example, an alkylene structural unit, an alkenylene structural unit, an alkyl structural unit, an alkanetriyl structural unit, an alkanetetrayl structural unit, and the like. The aliphatic hydrocarbon structural unit includes at least an alkylene structural unit.

The alkylene structural unit is a structural unit including an alkylene structure and is preferably a structural unit only consisting of an alkylene structure. The alkylene structure is preferably a linear alkylene structure or a branched alkylene structure.

The alkylene structural unit preferably includes a structural unit represented by the following general formula (1A).

General Formula (1A)

General formula (1A)

[Chemical formula 1]

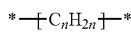

In general formula (1A), n represents an integer of 1 or more. n is preferably an integer of 2 or more, more preferably an integer of 3 or more, and particularly preferably an integer of 4 or more. n is preferably an integer of 6 or less, more preferably an integer of 5 or less; in particular, n is preferably 4.

In the present specification, "*" represents a bonding portion with another structure.

The alkylene structural unit preferably includes a structural unit represented by the following general formula (1B).

General formula (1B)

General formula (1B)

[Chemical formula 2]

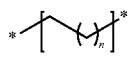

In general formula (1B), n represents an integer of 1 or more. n is preferably an integer of 2 or more, and more preferably an integer of 3 or more. n is preferably an integer of 5 or less, and more preferably an integer of 4 or less. In particular, n is preferably 3.

The alkylene structural unit preferably includes a structural unit represented by the following general formula (1C).

General formula (1C)

General formula (1C)

[Chemical formula 3]

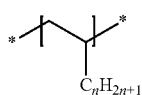

In general formula (1C), n represents an integer of 1 or more. n is preferably an integer of 4 or less, more preferably an integer of 3 or less, and further preferably an integer of 2 or less. In particular, n is preferably 2.

The method of introducing the alkylene structural unit into Copolymer I is not particularly limited and may include, for example, the following method (1a) or (1b).

In the method (1a), the copolymer is prepared by a polymerization reaction using a monomer composition containing a conjugated diene monomer. The prepared copolymer includes a monomer unit derived from the conjugated diene monomer. In the present invention, the "monomer unit derived from the conjugated diene monomer" may be referred to as the "conjugated diene monomer unit", and the same may apply to the monomer units derived from other monomers. Subsequently, at least a part of the conjugated diene monomer unit is converted into an alkylene structural unit by hydrogenating the conjugated diene monomer unit. Hereinafter, "hydrogenation" may be referred to as "hydrogenation". The finally obtained Copolymer I includes the hydrogenated unit of the conjugated diene monomer unit as the alkylene structural unit.

Moreover, the conjugated diene monomer unit includes at least a monomer unit having one carbon-carbon double bond. For example, a 1,3-butadiene monomer unit being a conjugated diene monomer unit includes at least one monomer unit selected from the group consisting of a monomer unit having a cis-1,4 structure, a monomer unit having a trans-1,4 structure, and a monomer unit having a 1,2 structure, and may also include two or more monomer units. In addition, the conjugated diene monomer unit may further include a monomer unit having no carbon-carbon double bond and having a branch point. In the present specification, the "branch point" refers to a branch point in a branched polymer, and when the conjugated diene monomer unit includes a monomer unit including a branch point, the above-prepared copolymer and Copolymer I are branched polymers.

In the method (1b), the copolymer is prepared by a polymerization reaction using a monomer composition including an α-olefin monomer. The prepared copolymer includes an α-olefin monomer unit. The finally obtained Copolymer I includes the α-olefin monomer unit as the alkylene structural unit.

Of the above two methods, the method (1a) is preferable because the copolymer can be easily produced. The carbon number of the conjugated diene monomer is 4 or more, and preferably 4 or more and 6 or less. The conjugated diene monomer may be a conjugated diene compound such as 1,3-butadiene, isoprene, 2,3-dimethyl-1,3-butadiene and 1,3-pentadiene. In particular, 1,3-butadiene is preferable. The alkylene structural unit preferably includes a structural unit obtained by hydrogenating the conjugated diene monomer unit (a hydrogenated conjugated diene monomer unit), and more preferably includes a structural unit obtained by hydrogenating the 1,3-butadiene monomer unit (a hydrogenated 1,3-butadiene monomer unit). The conjugated diene monomer can be used independently or in combination of two or more.

The hydrogenation is preferably a method capable of selectively hydrogenating the conjugated diene monomer unit. The hydrogenation methods include known methods such as oil layer hydrogenation or aqueous layer hydrogenation.

The hydrogenation can be performed in the usual way. The hydrogenation can be performed, for example, by dissolving a copolymer having a conjugated diene monomer unit in a suitable solvent and treating the solution with hydrogen gas in the presence of a hydrogenation catalyst. The hydrogenation catalyst includes nickel, palladium, platinum, copper and the like.

In the method (1b), the carbon number of the α-olefin monomer is 2 or more, preferably 3 or more, and more preferably 4 or more. The carbon number of the α-olefin monomer is preferably 6 or less, and more preferably 5 or less. The α-olefin monomer may be, for example, an α-olefin compound such as ethylene, propylene, 1-butene and 1-hexene. The α-olefin monomer can be used independently or in combination of two or more.

The alkylene structural unit preferably includes at least one structural unit selected from the group consisting of a structural unit including a linear alkylene structure and a structural unit including a branched alkylene structure, more preferably includes at least one structural unit selected from the group consisting of a structural unit only consisting of a linear alkylene structure and a structural unit only consisting of a branched alkylene structure, and further preferably includes at least one structural unit selected from the group consisting of the structural unit represented by formula (1B), and the structural unit represented by formula (1C).

The alkylene structural unit may include a structural unit including a linear alkylene structure and a structural unit including a branched alkylene structure. When the alkylene structural unit includes a structural unit including a linear alkylene structure and a structural unit including a branched alkylene structure, the content of the structural unit including a branched alkylene structure is preferably 70 mass % or less and more preferably 65 mass % or less based on the mass of the alkylene structural unit (that is, taking the mass of the alkylene structural unit as 100 mass %). In particular, the content is preferably 20 mass % or less, more preferably 18 mass % or less, and further preferably 15 mass % or less. When Copolymer I includes a structural unit including a linear alkylene structure and a structural unit including a branched alkylene structure, the content of the structural unit including a branched alkylene structure may be, for example, 1 mass % or more, 5 mass % or more, and even 10 mass % or more based on the mass of the alkylene structural unit (that is, taking the mass of the alkylene structural unit as 100 mass %).

In the aliphatic hydrocarbon structural unit, the content of the alkylene structural unit is preferably 60 mass % or more, more preferably 70 mass % or more, further preferably 80 mass % or more, and particularly preferably 90 mass % or more based on the total mass of the aliphatic hydrocarbon structural units (that is, taking the mass of the aliphatic hydrocarbon structural unit as 100 mass %). The content of the alkylene structural unit is, for example, less than 100 mass % and may be 99.5 mass % or less, 99 mass % or less, or 98 mass % or less based on the total mass of the aliphatic hydrocarbon structural units (that is, taking the mass of the aliphatic hydrocarbon structural units as 100 mass %). The content of the alkylene structural unit may be 100 mass %.

The content of the aliphatic hydrocarbon structural unit is preferably 40 mass % or more, more preferably 50 mass % or more, and further preferably 60 mass % or more based on the mass of Copolymer I (that is, taking the mass of Copolymer I as 100 mass %). The content of the aliphatic hydrocarbon structural unit is preferably less than 85 mass %, more preferably 75 mass % or less, and further preferably 70 mass % or less based on the mass of Copolymer I (that is, taking the mass of Copolymer I as 100 mass %).

The nitrile group-containing structural unit is a structural unit including a nitrile group, and preferably includes a structural unit including an alkylene structure substituted by a nitrile group, and more preferably includes a structural unit only consisting of an alkylene structure substituted by a nitrile group. The alkylene structure is preferably a linear or branched alkylene structure. The nitrile group-containing structural unit may further include a structural unit including (or only consisting of) an alkyl structure substituted by a nitrile group. The number of the nitrile group contained in the nitrile group-containing structural unit is preferably one.

The nitrile group-containing structural unit preferably includes a structural unit represented by the following general formula (2A).

General Formula (2A)

General formula (2A)

[Chemical formula 4]

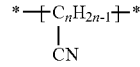

In general formula (2A), n represents an integer of 2 or more. n is preferably an integer of 6 or less, more preferably an integer of 4 or less, and further preferably an integer of 3 or less. In particular, n is preferably 2.

The nitrile group-containing structural unit preferably includes a structural unit represented by the following general formula (2B).

General Formula (2B)

General formula (2B)

[Chemical formula 5]

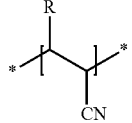

In general formula (2B), R represents a hydrogen atom or a methyl group. R is preferably a hydrogen atom.

The method for introducing the nitrile group-containing structural unit into Copolymer I is not particularly limited, and the method (method 2a) for preparing the copolymer by a polymerization reaction using a monomer composition containing a nitrile group-containing monomer can be preferably used. The finally obtained Copolymer I includes the nitrile group-containing monomer unit as the nitrile group-containing structural unit. The nitrile group-containing monomer capable of forming the nitrile group-containing structural unit may be a monomer including a polymerizable carbon-carbon double bond and a nitrile group, for example, an α,β-ethylenically unsaturated group-containing compound having a nitrile group. Specifically, the nitrile group-containing monomer may be acrylonitrile, methacrylonitrile, and the like. In particular, the nitrile group-containing monomer preferably includes acrylonitrile from the viewpoint of enhancing the intermolecular force between Copolymers I and/or between Copolymer I and the material to be dispersed (a material to be adsorbed). The nitrile group-containing monomer can be used independently or in combination of two or more.

The content of the nitrile group-containing structural unit is preferably 15 mass % or more, more preferably 20 mass % or more, and further preferably 30 mass % or more based on the mass of Copolymer I (that is, taking the mass of Copolymer I as 100 mass %). The content of the nitrile group-containing structural unit is preferably 50 mass % or less, more preferably 46 mass % or less, and further preferably 40 mass % or less based on the mass of Copolymer I (that is, taking the mass of Copolymer I as 100 mass %). By setting the content of the nitrile group-containing structural unit in the above range, the adsorptivity to the material to be dispersed and the affinity for the dispersion medium can be controlled, and the material to be dispersed can be stably present in the dispersion medium. Additionally, the affinity of Copolymer I for the electrolytic solution can be controlled, and problems such as an increase in the resistance of the electrolytic solution due to the dissolution of Copolymer I in the electrolytic solution in the battery can be prevented.

The amide group-containing structural unit is a structural unit including an amide group, and preferably includes a structural unit including an alkylene structure substituted by an amide group, and more preferably includes a structural unit only consisting of an alkylene structure substituted by an amide group. The alkylene structure is preferably a linear or branched alkylene structure. The amide group-containing structural unit may further include a structural unit including (or only consisting of) an alkyl structure substituted by an amide group. The number of the amide group contained in the amide group-containing structural unit is preferably one. The amide group is a substituted or unsubstituted carbamoyl group, and the substituent may be an alkyl group, a hydroxyalkyl group, and the like. The amide group-containing structural unit is contained in Copolymer I, and thereby the adsorptivity to the material to be dispersed can be significantly enhanced, and the dispersibility and the robustness can be improved. In addition, the amide group can form a strong hydrogen bond, and thus a cross-linked structure formed by a hydrogen bond may be introduced into the molecule of Copolymer I by containing the amide group-containing structural unit in Copolymer I. The Copolymer I having a cross-linked structure introduced therein can be three-dimensionally adsorbed to the material to be dispersed, so that the dispersibility and the robustness can be further improved.

The amide group-containing structural unit preferably includes a structural unit represented by the following general formula (3A).

General Formula (3A)

General formula (3A)

[Chemical formula 6]

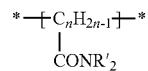

In general formula (3A), n represents an integer of 2 or more. n is preferably an integer of 6 or less, more preferably an integer of 4 or less, and further preferably an integer of 3 or less. In particular, n is preferably 2. R' is each independently a hydrogen atom or a substituent. The substituent is preferably an alkyl group or a hydroxyalkyl group. Preferably, at least one of R' is a hydrogen atom, and more preferably, two R' are hydrogen atoms.

The amide group-containing structural unit preferably includes a structural unit represented by the following general formula (3B).

General Formula (3B)

General formula (3B)

[Chemical formula 7]

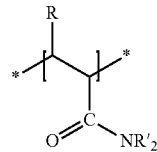

In general formula (3B), R represents a hydrogen atom or a methyl group. R is preferably a hydrogen atom. R' is each independently a hydrogen atom or a substituent. The substituent is preferably an alkyl group or a hydroxyalkyl group. Preferably, at least one of R' is a hydrogen atom, and more preferably, two R' are hydrogen atoms.

The method for introducing the amide group-containing structural unit into Copolymer I is not particularly limited and includes, for example, the following method (3a) or (3b).

In the method (3a), the copolymer is prepared by a polymerization reaction using a monomer composition containing an amide group-containing monomer. The prepared copolymer includes an amide group-containing monomer unit. The finally obtained Copolymer I includes the amide group-containing monomer unit as the amide group-containing structural unit.

In the method (3b), the copolymer including a nitrile group-containing structural unit is prepared. Subsequently, by hydrolyzing the nitrile group contained in the nitrile group-containing structural unit in a basic atmosphere, at least a part of the nitrile group-containing structural unit is converted into an amide group-containing structural unit. The copolymer including the nitrile group-containing structural unit can be obtained, for example, by the method (2a). The finally obtained Copolymer I includes a unit obtained by hydrolyzing the nitrile group contained in the nitrile group-containing structural unit as the amide group-containing structural unit.

When Copolymer I is prepared by the method (3b), the introduction of an amide group into Copolymer I can be confirmed by NMR (nuclear magnetic resonance) and/or IR (infrared spectroscopy) measurement. In addition, it can be confirmed simply by a change in the weight-average molecular weight and/or the viscosity (viscosity of the solution) between the copolymer before hydrolysis and Copolymer I. The weight-average molecular weight of Copolymer I tends to be smaller than the weight-average molecular weight of the copolymer before hydrolysis (for example, 0.05-0.6 time). Additionally, for example, the viscosity of the solution of Copolymer I at a shear stress of 1,000/s tends to be smaller than the viscosity of the solution of the copolymer before hydrolysis at a shear stress of 1,000/s (for example, 0.05-0.6 time). Moreover, regardless of the preparation method of Copolymer I, the introduction of the amide group into Copolymer I can be similarly confirmed by NMR (nuclear magnetic resonance) and/or IR (infrared spectroscopy) measurement.

In the method (3a), the amide group-containing monomer may be, for example, monoalkyl (meth)acrylamides such as (meth)acrylamide, N-methyl (meth)acrylamide, N-ethyl (meth)acrylamide, N-propyl (meth)acrylamide, N-isopropyl (meth)acrylamide; dialkyl (meth)acrylamides such as N,N-dimethyl (meth)acrylamide, N,N-diethyl (meth)acrylamide; N-(hydroxyalkyl) (meth)acrylamides such as N-(2-hydroxyethyl) (meth)acrylamide, N-(2-hydroxypropyl) (meth)acrylamide, N-(2-hydroxybutyl) (meth)acrylamide; diacetone (meth)acrylamide; acryloylmorpholine, and the like. The term "(meth)acrylate" in the present specification means acrylate or methacrylate. In particular, the amide group-containing monomer preferably includes at least one monomer selected from the group consisting of acrylamide, methacrylamide, and N,N-dimethylacrylamide. The amide group-containing monomer can be used independently or in combination of two or more.

In the method (3b), at least one kind of base selected from the group consisting of an inorganic base and an organic hydroxide (organic base) can be used to create a basic atmosphere.

The inorganic base may be, for example, chloride, hydroxide, carbonate, nitrate, sulfate, phosphate, tungstate, vanadate, molybdate, niobate, or boric acid salt of alkali metal or alkaline earth metal; and ammonium hydroxide and the like. Among the above, the hydroxide of the alkali metal or the alkaline earth metal is preferable from the viewpoint of easily supplying cations. The alkali metal hydroxide may be, for example, lithium hydroxide, sodium hydroxide, potassium hydroxide and the like. The alkaline earth metal hydroxide may be, for example, calcium hydroxide, magnesium hydroxide and the like. Among the above, it is more preferable to use at least one hydroxide selected from the group consisting of lithium hydroxide, sodium hydroxide, and potassium hydroxide. Moreover, the metal contained in the inorganic base may be a transition metal.

An organic hydroxide is a salt including an organic cation and a hydroxide ion. The organic hydroxide may be, for example, trimethyl-2-hydroxyethylammonium hydroxide, tetramethylammonium hydroxide, cetyltrimethylammonium hydroxide, hexadecyltrimethylammonium hydroxide, trimethylphenylammonium hydroxide, 3-trifluoromethyl-phenyltrimethylammonium hydroxide, benzyltrimethylammonium hydroxide, and the like. Among the above, it is particularly preferable to use at least one hydroxide selected from the group consisting of trimethyl-2-hydroxyethylammonium hydroxide and tetramethylammonium hydroxide.

The amount of the base that is used is preferably 1 mass % or more, more preferably 2 mass % or more, and further preferably 3 mass % or more based on the mass of the copolymer. The amount of the base that is used is preferably 20 mass % or less, more preferably 15 mass % or less, and further preferably 10 mass % or less based on the mass of the copolymer. When the amount of usage is too small, modification of the nitrile group induced by hydrolysis tends to be less likely to occur, whereas too much usage may cause corrosion inside the disperser and/or the battery.

In the method (3b), hydrolysis can be performed by mixing a copolymer including an alkylene structural unit and a nitrile group-containing monomer unit, a base, and a solvent. Further, it may be mixed with any components. The addition order of the copolymer, the base and the solvent to the container and the mixing method are not limited. The copolymer, the base and the solvent may be added to the container at the same time or be added separately to the container. Otherwise, one or both of the copolymer and the base may be mixed with the solvent to prepare a copolymer-containing liquid and/or a base-containing liquid, and the copolymer-containing liquid and/or the base-containing liquid are/is added to the container. In particular, in terms of being capable of efficiently modifying the nitrile group, it is preferable to add the base dispersion liquid in which the base is dispersed in the solvent to the copolymer solution in which the copolymer is dissolved in the solvent, while stirring the mixture. A disperser, a homogenizer, or the like can be used for stirring. The solvent mentioned in the description of the dispersant composition described later can be used as the solvent.

There is no limitation on the temperature during mixing, but modification can be hastened by heating to 30° C. or higher. Additionally, a small amount of water and/or alcohol may be added to the container to accelerate the modification. Water and/or alcohol may be added to the container while mixing the copolymer and the base, or may be added to the container before adding the copolymer and the base to the container, or may be added to the container simultaneously or subsequent to the addition of the copolymer and the base. In addition, when the hygroscopicity of the copolymer, the base, and optional components used as necessary is high, water may be added in the form hygroscopic water. The amount of water and/or alcohol is preferably 0.05 to 20 mass %, more preferably 0.05 to 5 mass %, and further preferably 0.05 to 1 mass % based on the mass of the copolymer.

The alcohol may be, for example, methanol, ethanol, propanol, isopropanol, butanol, isobutanol, secondary butanol, tertiary butanol, benzyl alcohol, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol and the like. The alcohol can be used independently or in combination of two or more. The hydrolysis is preferably performed in the presence of at least one selected from the group consisting of methanol, ethanol and water, and particularly preferably performed in the presence of water.

The content of the amide group-containing structural unit is preferably 10 mass % or less, more preferably 5 mass % or less, further preferably 3 mass % or less, particularly preferably 1 mass % or less based on the mass of Copolymer I (that is, taking the mass of Copolymer I as 100 mass %). When the content of the amide group-containing structural unit is equal to or less than the above range, the gelation of the conductive material dispersion during storage caused by excessively strong hydrogen bonding between Copolymers I can be prevented. The content of the amide group-containing structural unit is preferably 0.1 mass % or more, more preferably 0.3 mass % or more, further preferably 0.5 mass % or more, particularly preferably 0.7 mass % or more based on the mass of Copolymer I (that is, taking the mass of Copolymer I as 100 mass %). When the content of the amide group-containing structural unit is equal to or greater than the above range, the adsorptivity to the material to be dispersed can be sufficiently enhanced, and good improvement in the dispersibility and the robustness can be achieved.

Copolymer I may include an optional structural unit. The optional structural unit may be a carboxyl group-containing structural unit and the like. In addition, the aliphatic hydrocarbon structural unit may be, for example, a structural unit including a branch point, such as an alkenylene structural unit; an alkyl structural unit; an alkanetriyl structural unit, an alkanetetrayl structural unit, and the like. The structural unit including a branch point is a structural unit different from the structural unit including a branched alkylene structure and the structural unit including a branched alkyl structure.

The carboxyl group-containing structural unit is a structural unit including a carboxyl group, and preferably includes a structural unit including an alkylene structure substituted by a carboxyl group, and more preferably includes a structural unit only consisting of an alkylene structure substituted by a carboxyl group. The alkylene structure is preferably a linear or branched alkylene structure. The carboxyl group-containing structural unit may further include a structural unit including (or only consisting of) an alkyl structure substituted by a carboxyl group. The number of the carboxyl group contained in the carboxyl group-containing structural unit is preferably 1 or 2. The carboxyl group-containing structural unit is contained in Copolymer I, and thereby the adsorptivity to the material to be dispersed can be significantly enhanced, the viscosity of the conductive material dispersion can be reduced, and the dispersion efficiency can be improved.

The carboxyl group-containing structural unit preferably includes a structural unit represented by the following general formula (4A).

General Formula (4A)

General formula (4A)

[Chemical formula 8]

In general formula (4A), n represents an integer of 2 or more. n is preferably an integer of 6 or less, more preferably an integer of 4 or less, and further preferably an integer of 3 or less. In particular, n is preferably 2.

The carboxyl group-containing structural unit preferably includes a structural unit represented by the following general formula (4B).

General Formula (4B)

General formula (4B)

[Chemical formula 9]

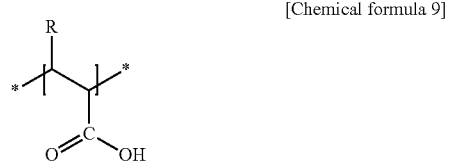

In general formula (4B), R represents a hydrogen atom or a methyl group. R is preferably a hydrogen atom.

The method of introducing the carboxyl group-containing structural unit is not particularly limited and includes, for example, the following method (4a) or (4b).

In the method (4a), the copolymer is prepared by a polymerization reaction using a composition containing a carboxyl group-containing monomer. The prepared copolymer includes a carboxyl group-containing monomer unit. The finally obtained Copolymer I includes the carboxyl group-containing monomer unit as the carboxyl group-containing structural unit.

In the method (4b), the copolymer including an amide group-containing structural unit is prepared. Subsequently, the amide group-containing structural unit is converted into a carboxyl group-containing structural unit by hydrolyzing the amide group contained in the amide group-containing structural unit in an acidic atmosphere. The copolymer including the amide group-containing structural unit can be obtained, for example, by the method (3a) or (3b). The finally obtained Copolymer I includes a unit obtained by modifying the amide group contained in the amide group-containing structural unit by hydrolysis, as a carboxyl group-containing structural unit.

In the method (4a), the carboxyl group-containing monomer may be, for example, an unsaturated monocarboxylic acid such as (meth)acrylic acid, crotonic acid, isocrotonic acid, and the like; an unsaturated dicarboxylic acid such as maleic acid, fumaric acid, citraconic acid, mesaconic acid, glutaconic acid, itaconic acid, and the like. In particular, the carboxyl group-containing monomer preferably includes at least one acid selected from the group consisting of acrylic acid and maleic acid. The carboxyl group-containing monomer can be used independently or in combination of two or more.

In the method (4b), at least one acid selected from the group consisting of an inorganic acid and an organic acid can be used to create an acidic atmosphere.

The inorganic acid may be hydrochloric acid, nitric acid, phosphoric acid, sulfuric acid, boric acid, hydrofluoric acid and the like. The organic acid may be formic acid, acetic acid, citric acid, oxalic acid, succinic acid, malic acid, benzoic acid, benzenesulfonic acid, and the like. Among the above, the succinic acid and the citric acid are preferable.

The amount of the acid that is used is preferably 0.1 mass % or more, more preferably 0.5 mass % or more, and further preferably 1 mass % or more based on the mass of the copolymer. The amount of the acid that is used is preferably 10 mass % or less, more preferably 5 mass % or less, and further preferably 3 mass % or less based on the mass of the copolymer. When the usage amount is too small, modification of the amide group induced by hydrolysis tends to be less likely to occur, whereas too much usage may cause corrosion inside the disperser and/or the battery.

The content of the carboxyl group-containing structural unit is preferably less than 1 mass %, more preferable 0.5 mass % or less, and further preferably 0.3 mass % or less based on the mass of Copolymer I (that is, taking the mass of Copolymer I as 100 mass %). When the content of the carboxyl group-containing structural unit is less than (or equal to or less than) the above range, the gelation of the conductive material dispersion (described later) during storage caused by excessively strong hydrogen bonding between Copolymers I can be prevented. The content of the carboxyl group-containing structural unit is preferably 0.01 mass % or more, more preferably 0.1 mass % or more, and further preferably 0.3 mass % or more based on the mass of Copolymer I (that is, taking the mass of Copolymer I as 100 mass %). When the content of the carboxyl group-containing structural unit is equal to or greater than the above range, the adsorptivity to the material to be dispersed can be sufficiently enhanced, the viscosity of the conductive material dispersion can be reduced, and the dispersion efficiency can be improved.

The alkenylene structural unit is a structural unit including an alkenylene structure and is preferably a structural unit only consisting of an alkenylene structure. The alkenylene structure is preferably a linear alkenylene structure or a branched alkenylene structure.

The alkenylene structural unit preferably includes at least one structural unit selected from the group consisting of a structural unit including a linear alkenylene structure and a structural unit including a branched alkenylene structure, and more preferably includes at least one structural unit selected from the group consisting of a structural unit only consisting of a linear alkenylene structure unit and a structural unit consisting of only a branched alkenylene structure.

For example, when Copolymer I is obtained by the method (1a), a conjugated diene monomer unit having a carbon-carbon double bond in the unit may remain in the molecule of Copolymer I without being hydrogenated. The finally obtained Copolymer I may include the conjugated diene monomer unit having a carbon-carbon double bond in the unit as the alkenylene structural unit.

The alkyl structural unit is a structural unit including an alkyl structure (however, it is a structural unit that does not fall under other aliphatic hydrocarbon structural units such as branched alkylene structural units, nitrile group-containing structural units, amide group-containing structural units, and carboxyl group-containing structural units), and is preferably a structural unit only consisting of an alkyl structure. The alkyl structure is preferably a linear alkyl structure or a branched alkyl structure.

The alkyl structural unit preferably includes at least one structural unit selected from the group consisting of a structural unit including a linear alkyl structure and a structural unit including a branched alkyl structure, and more preferably includes at least one structural unit selected from the group consisting of a structural unit only consisting of a branched alkyl structure and a structural unit only consisting of a linear alkyl structure.

For example, when Copolymer I is obtained by the method (1a) or (1b), it is preferable that at least a hydrogenated conjugated diene monomer unit or an α-olefin monomer unit is introduced into Copolymer I as a terminal group of Copolymer I. The finally obtained Copolymer I may include these monomer units as the alkyl structural unit.

The alkanetriyl structural unit is a structural unit including an alkanetriyl structure and is preferably a structural unit only consisting of an alkanetriyl structure. The alkanetetrayl structural unit is a structural unit including an alkanetetrayl structure and is preferably a structural unit only consisting of an alkanetetrayl structure.

For example, when Copolymer I is obtained by the method (1a), the conjugated diene monomer unit may be introduced into the molecule of Copolymer I as a monomer unit having no carbon-carbon double bond in the unit and containing a branch point. In this case, the finally obtained Copolymer I is a branched polymer, and may include the conjugated diene monomer unit as the aliphatic hydrocarbon structural unit containing a branch point, such as an alkanetriyl structural unit and an alkanetetrayl structural unit. When the aliphatic hydrocarbon structural unit includes a structural unit including a branch point, Copolymer I is a branched polymer. The branched polymer may be a network polymer. Copolymer I including a structural unit that includes a branch point can be three-dimensionally adsorbed to the material to be dispersed, and thus the dispersibility and the robustness can be further enhanced.

The following is listed as preferable aspects of Copolymer I.

Copolymer I in which the total content of the aliphatic hydrocarbon structural unit, the nitrile group-containing structural unit, and the carbamoyl group-containing structural unit contained in Copolymer I is 80 mass % or more and 100 mass % or less based on the mass of Copolymer I. The total content is preferably 90 mass % or more, more preferably 95 mass % or more, and further preferably 98 mass % or more.

Copolymer I in which the total content of the aliphatic hydrocarbon structural unit, the nitrile group-containing structural unit, the carbamoyl group-containing structural unit, and the carboxyl group-containing structural unit contained in Copolymer I is 80 mass % or more and 100 mass % or less based on the mass of Copolymer I. The total content is preferably 90 mass % or more, more preferably 95 mass % or more, and further preferably 98 mass % or more.

Copolymer I which includes the structural unit represented by general formula (1A), the structural unit represented by general formula (2A), and the structural unit represented by general formula (3A) and may include the structural unit represented by general formula (4A) as an optional structural unit, and in which the total content of the structural units is 80 mass % or more and 100 mass % or less based on the mass of Copolymer I. The total content is preferably 90 mass % or more, more preferably 95 mass % or more, and further preferably 98 mass % or more.

Copolymer I which includes the structural unit represented by general formula (1A), the structural unit represented by general formula (2B), and the structural unit represented by general formula (3B) and may include the structural unit represented by general formula (4B) as an optional structural unit, and in which the total content of the structural units is 80 mass % or more and 100 mass % or less based on the mass of Copolymer I. The total content is preferably 90 mass % or more, more preferably 95 mass % or more, and further preferably 98 mass % or more.

Copolymer I which includes the structural unit represented by general formula (1B), the structural unit represented by general formula (2B), and the structural unit represented by general formula (3B) and may include the structural unit represented by general formula (4B) as an optional structural unit, and in which the total content of the structural units is 80 mass % or more and 100 mass % or less based on the mass of Copolymer I. The total content is preferably 90 mass % or more, more preferably 95 mass % or more, and further preferably 98 mass % or more.

In the present specification, the content of the structural unit can be obtained by using the amount of the monomer that is used, NMR (nuclear magnetic resonance) and/or IR (infrared spectroscopy) measurement.

The following is listed as preferred aspects of the method for producing Copolymer I.

The method for producing Copolymer I which includes:
preparing a copolymer by a polymerization reaction using a monomer composition containing a conjugated diene monomer and a nitrile group-containing monomer (methods (1a) and (2a)); hydrogenating the conjugated diene monomer unit contained in the copolymer (method (1a)); and modifying the nitrile group-containing structural unit contained in the copolymer by hydrolysis (method (3b)).

In this method, a part or all of the conjugated diene monomer unit is hydrogenated. Additionally, a part (not all) of the nitrile group-containing structural unit is modified by hydrolysis so that the nitrile group-containing structural unit is contained in Copolymer I.

The method for producing Copolymer I which includes: preparing a copolymer by a polymerization reaction using a monomer composition containing a conjugated diene monomer, a nitrile group-containing monomer, and an amide group-containing monomer (methods (1a), (2a) and (3a)); and hydrogenating the conjugated diene monomer unit contained in the copolymer (method (1a)).

In this method, a part or all of the conjugated diene monomer unit is hydrogenated.

In the production method according to the above aspects, the monomer composition may further include a carboxyl group-containing monomer. Alternatively, the production method according to the above aspects may further include modifying the amide group-containing structural unit by hydrolysis (method (4b)). In this method, a part (not all) of the amide group-containing structural unit is modified by hydrolysis.

Copolymer I produced by the method (3b) can be used as a dispersant in the state of a mixture (dispersant-containing liquid) containing Copolymer I, the base and the solvent after hydrolysis. Alternatively, Copolymer I produced by the method (3b) can be used as a dispersant in the state of a mixture (dispersant-containing liquid) containing Copolymer I and the solvent after extracting and removing the base from the mixture (dispersant-containing liquid) containing Copolymer I, the base and the solvent after hydrolysis. The method for extracting and removing the base is not particularly limited and may include, for example, a method of dripping the mixture (dispersant-containing liquid) into a washing solvent which is a good solvent for the base but a poor solvent for Copolymer I, and collecting the precipitated copolymer I. The more the washing solvent that is added, the higher the removal efficiency becomes. In addition, the removal efficiency can also be increased by re-dissolving the precipitated copolymer I and repeatedly washing Copolymer I. The washing may be performed in the same manner after a solvent which is a good solvent for both the base and Copolymer I is sufficiently mixed with the mixture (dispersant-containing liquid).

The polymerization reaction used for the preparation of the copolymer is preferably an emulsion polymerization reaction, and a common emulsion polymerization method can be used. The polymerization agent, such as an emulsifier (surfactant), a polymerization initiator, a chelating agent, an oxygen scavenger, and a molecular weight modifier, used for the emulsion polymerization can be a conventionally known agent and is not particularly limited. For example, an anionic emulsifier or an anionic emulsifier and a nonionic emulsifier are typically used as an emulsifier.

The anionic emulsifier may be, for example, a fatty acid salt such as tallow fatty acid potassium, partially hydrogenated tallow fatty acid potassium, potassium oleate, and sodium oleate; a resin acid salt such as potassium rosinate, sodium rosinate, hydrogenated potassium rosinate and hydrogenated sodium rosinate; an alkylbenzene sulfonate such as sodium dodecylbenzene sulfonate; and the like. The nonionic emulsifier may be, for example, a polyethylene glycol ester emulsifier, a polypropylene glycol ester emulsifier, a pluronic emulsifier such as a block copolymer of ethylene oxide and propylene oxide, and the like.

The polymerization initiator may be, for example, a thermally decomposable initiator such as persulfate such as potassium persulfate and ammonium persulfate; an organic peroxide such as t-butyl hydroperoxide, cumene hydroperoxide, diisopropylbenzene hydroperoxide, octanoyl peroxide, 3,5,5-trimethylhexanoyl peroxide; an azo compound such as azobisisobutyro nitrile; a redox initiator consisting of the above initiator and a reducing agent such as divalent iron ion. Among the above, the redox initiator is preferable. The amount of the initiator that is used is, for example, in the range of 0.01 to 10 mass % with respect to the total amount of the monomers.

The emulsion polymerization reaction may be either a continuous type or a batch type. The polymerization temperature may be any of a low temperature to a high temperature, and is preferably 0° C. to 50° C., more preferably 0° C. to 35° C. In addition, the method of adding the monomer (collective addition, divided addition, and the like), the polymerization time, the polymerization conversion rate and the like are not particularly limited. The conversion rate is preferably 85 mass % or more, and more preferably 90 mass % or more.

The weight-average molecular weight of Copolymer I is preferably 5,000 or more, more preferably 10,000 or more, and further preferably 50,000 or more. The weight-average molecular weight of Copolymer I is preferably 400,000 or less, more preferably 350,000 or less, and further preferably 300,000 or less. When the weight-average molecular weight of Copolymer I is 5,000 or more and 400,000 or less, the adsorptivity to the material to be dispersed and the affinity to the dispersion medium are excellent, and the stability of the dispersion is improved. The weight-average molecular weight is a polystyrene equivalent weight-average molecular weight and can be measured by gel permeation chromatography (GPC). Specifically, it may be measured by the method described in examples.

The dispersant contains at least Copolymer I. The dispersant may further contain any polymer, any copolymer and the like. The content of Copolymer I in the dispersant is preferably 50 mass % or more, more preferably 80 mass % or more, and further preferably 90 mass % or more. The content of Copolymer I in the dispersant may be 100 mass %, in which case the dispersant only consists of Copolymer I.

<Dispersant Composition>

The dispersant composition contains a dispersant, a base of 1 mass % or more and 20 mass % or less based on the mass of Copolymer I, and a solvent. That is, the dispersant composition contains Copolymer I, a base of 1 mass % or more and 20 mass % or less based on the mass of Copolymer I, and a solvent. When Copolymer I is obtained by the method (3b), the dispersant composition may contain the base used in the method (3b). The content of the base is 1 mass % or more, preferably 2 mass % or more, and more preferably 3 mass % or more based on the mass of Copolymer I. From the viewpoint of preventing gelation, thickening over time, and corrosion inside the dispersion device and/or the battery, the content of the base is 20 mass % or less, preferably 15 mass % or less, and more preferably 10 mass % or less based on the mass of Copolymer I. The dispersant composition may contain an optional component such as an acid.

The dispersant composition contains a solvent. The solvent is preferably a solvent capable of dissolving Copolymer I, and more preferably a solvent consisting of any one of water-soluble organic solvents, or a mixed solvent consisting of any two or more of water-soluble organic solvents.

The water-soluble organic solvent may be an amide solvent (N-methyl-2-pyrrolidone (NMP), N-ethyl-2-pyrrolidone (NEP), N,N-dimethyl formamide, N,N-dimethyl acetamide, N,N-diethyl acetamide, N-methyl caprolactam, and the like), a heterocyclic solvent (cyclohexyl pyrrolidone, 2-oxazolidone, 1,3-dimethyl-2-imidazolidinone, γ-butyrolactone, and the like), a sulfoxide solvent (dimethyl sulfoxide and the like), a sulfone solvent (hexamethyl phosphorotriamide, sulfolane, and the like), a lower ketone solvent (acetone, methyl ethyl ketone, and the like), as well as tetrahydrofuran, urea, acetonitrile, and the like. The water-soluble organic solvent preferably includes an amide organic solvent, and more preferably includes at least one solvent selected from the group consisting of N-methyl-2-pyrrolidone and N-ethyl-2-pyrrolidone.

From the viewpoint of obtaining a sufficient concentration of the conductive material and/or the electrode active material in the conductive material dispersion, the binder resin-containing conductive material dispersion, and the slurry for electrode film, the content of Copolymer I in the dispersant composition is preferably 2 mass % or more and more preferably 5 mass % or more based on the mass of the dispersant composition. When the concentration of the conductive material and/or the electrode active material is sufficient, coatability can be obtained, and an increase in manufacturing cost due to an increase in drying time and transfer cost can be prevented. From the viewpoint of preventing the generation of insoluble matter, the content of Copolymer I is preferably 15 mass % or less, and more preferably 10 mass % or less based on the mass of the dispersant composition.

The mixture (dispersant-containing liquid) which is obtained by the method (3b) and contains Copolymer I, the base, and the solvent may be used as the dispersant composition. In addition, the mixture (dispersant-containing liquid) which is obtained by the methods (3b) and (4b) and contains Copolymer I, the base, the acid, and the solvent may be used as a dispersant composition.

<Conductive Material Dispersion>

The conductive material dispersion contains the dispersant and the solvent, or contains the dispersant composition and the conductive material. That is, the conductive material dispersion contains at least the dispersant, the solvent, and the conductive material, or contains at least the dispersant composition (containing the solvent) and the conductive material. In other words, the conductive material dispersion contains at least Copolymer I, the solvent, and the conductive material, and may further contain any component such as a base and an acid.

A material capable of irreversibly doping or intercalating lithium ions can be used as the conductive material. The conductive material is a substance (material) different from the electrode active material described later.

The conductive material may be, for example, a metal powder of gold, silver, copper, silver-plated copper powder, silver-copper composite powder, silver-copper alloy, amorphous copper, nickel, chromium, palladium, rhodium, ruthenium, indium, silicon, aluminum, tungsten, molybdenum, platinum, and the like; an inorganic powder coated with these metals; and a carbon-based conductive material. The carbon-based conductive material may be various carbon blacks such as commercially available acetylene black, furnace black, hollow carbon black, channel black, thermal black and Ketjen black. Additionally, the carbon-based conductive material may also be a commonly used oxidized carbon black, graphitized carbon black, mesophase carbon black; an amorphous carbonaceous material such as soft carbon and hard carbon; carbon nanotube or carbon nanofiber which is fibrous carbon, and carbon fiber such as vapor-grown carbon fiber. The conductive material may be used independently or in combination of two or more. The conductive material preferably includes the carbon-based conductive material, preferably includes at least one selected from the group consisting of carbon black and carbon fiber, and particularly preferably includes at least one selected from the group consisting of acetylene black and carbon nanotube.

The carbon purity of the carbon-based conductive material is represented by the content rate (mass %) of the carbon atoms in the carbon-based conductive material. The carbon purity is preferably 90 mass % or more, more preferably 95 mass % or more, and further preferably 98 mass % or more based on the mass of the carbon-based conductive material (taking the mass of the carbon-based conductive material as 100 mass %).

The carbon nanotube has a structure in which planar graphite is wound in a cylindrical shape. The carbon nanotube preferably includes a multi-walled carbon nanotube, and may also include a multi-walled carbon nanotube and a single-walled carbon nanotube. The multi-walled carbon nanotube has a structure in which two or more layers of graphite are wound. The single-walled carbon nanotube has a structure in which one layer of graphite is wound. The side wall of the carbon nanotube is not necessarily a graphite structure. For example, a carbon nanotube provided with a sidewall having an amorphous structure can also be used as the conductive material.

The shape of the carbon nanotube is not limited. The shape of the carbon nanotube may be, for example, various shapes such as a needle shape, a cylindrical tube shape, a fish bone shape (fish bone or cup laminated type), a playing card shape (platelet), a coil shape, and the like. Of the above shapes, the carbon nanotube preferably has a needle shape or a cylindrical tube shape. Carbon nanotubes having the same shape may be used independently, or two or more kinds of carbon nanotubes having different shapes may be used in combination.

The form of the carbon nanotube includes, but is not limited to, a graphite whisker, a filamentous carbon, a graphite fiber, an ultrafine carbon tube, a carbon tube, a carbon fibril, a carbon microtube, and a carbon nanofiber. Carbon nanotubes having the same form may be used independently, or two or more kinds of carbon nanotubes having different forms may be used in combination.

The outer diameter of the carbon nanotube is preferably 1 to 30 nm, and more preferably 1 to 20 nm.

The BET specific surface area of the conductive material is preferably 20 to 1,000 $m^2/g$, and more preferably 30 to 500 $m^2/g$.

The content of Copolymer I contained in the conductive material dispersion is preferably 0.1 to 200 mass %, more preferably 1 to 100 mass %, and further preferably 2 to 50 mass % based on the mass of the conductive material (taking the mass of the conductive material as 100 mass %).

The content of the conductive material contained in the conductive material dispersion is preferably 0.05 mass % or more, more preferably 0.1 mass % or more based on the mass of the conductive material dispersion (taking the mass of the conductive material dispersion as 100 mass %). The content of the conductive material is preferably 30 mass % or less, and more preferably 20 mass % or less based on the mass of the conductive material dispersion (taking the mass of the conductive material dispersion as 100 mass %).

For example, from the viewpoint of achieving both excellent dispersibility and robustness, the content of the conductive material may be 10 mass % or less, preferably 8 mass % or less, more preferably 5 mass % or less, and further preferably 3 mass % or less. In particular, when a conductive material (such as CNT) having a high specific surface area is used as the conductive material, the content of the conductive material is preferably in the above range. Alternatively, for example, in terms of achieving both excellent dispersibility and robustness by Copolymer I even when the concentration of the conductive material is high, the content of the conductive material may be more than 10 mass %, preferably 12 mass % or more, and more preferably 15 mass % or more.

The conductive material dispersion includes a solvent. The solvent is not particularly limited; for example, the solvent exemplified in the description of the dispersant composition can be used. In addition, it is preferable to use the same solvent as the solvent contained in the dispersant composition.

The method for producing the conductive material dispersion is not particularly limited. The conductive material dispersion can be obtained, for example, by mixing the dispersant, the solvent, and the conductive material and dispersing the conductive material in the solvent. In addition to the dispersant, the solvent, and the conductive material, any component may be mixed. Alternatively, the conductive material dispersion can be obtained, for example, by mixing the dispersant composition (including the solvent) and the conductive material and dispersing the conductive material in the solvent. In addition to the dispersant composition and the conductive material, any component such as a solvent may be mixed. When a solvent is mixed, the solvent is preferably the same solvent as the solvent contained in the dispersant composition. The order of adding the dispersant or the dispersant composition and the conductive material to the container is not particularly limited. It is preferable that the dispersant exists together with the conductive material at any point in the process of dispersing the conductive material.

For example, when the amide group-containing structural unit is introduced into Copolymer I by the method (3b), the conductive material may be mixed with and dispersed in the mixture (dispersant-containing liquid) containing the copolymer I, the base, and the solvent after hydrolysis. Alternatively, the conductive material may be mixed with the copolymer, the base, and the solvent before hydrolysis, and the conductive material may be dispersed after hydrolysis. Alternatively, before hydrolysis, the conductive material may be mixed with the copolymer, the base, and the solvent to advance hydrolysis and dispersion. Furthermore, after the conductive material is dispersed by a wet or dry dispersion method, the copolymer or Copolymer I before or after hydrolysis may be mixed with a solvent as necessary and further dispersed.

The method using various dispersing devices such as a disperser, a homogenizer, a Silverson mixer, a kneader, a two-roll mill, a three-roll mill, a ball mill, a horizontal sand mill, a vertical sand mill, an annular bead mill, an attritor, a planetary mixer, or a high-pressure homogenizer can be used as the dispersion method.

The dispersibility of the conductive material in the conductive material dispersion can be evaluated by the complex elastic modulus and the phase angle obtained by dynamic viscoelasticity measurement. The complex elastic modulus of the conductive material dispersion is smaller when the dispersibility of the conductive material is better and the viscosity of the conductive material dispersion is lower. Additionally, the phase angle means the phase shift of the stress wave when the strain applied to the conductive material dispersion is set as a sine wave. When the conductive material dispersion is a pure elastic body, the phase angle is 0° because the strain wave becomes a sine wave having the same phase as the applied strain. On the other hand, when the conductive material dispersion is a pure viscous material, the stress wave advances by 90°. In generally used viscoelasticity measurement sample, the phase angle is a sine wave larger than 0° and smaller than 90°, and when the dispersibility of the conductive material in the conductive material dispersion is good, the phase angle approaches 90° which is the phase angle of a pure viscous material.

It is preferable that the conductive material dispersion has a complex elastic modulus of less than 20 Pa and a phase angle of 19° or more. The complex elastic modulus of the conductive material dispersion is preferably less than 20 Pa, more preferably 10 Pa or less, and further preferably 5 Pa or less. The complex elastic modulus of the conductive material dispersion is preferably 0.01 Pa or more, more preferably 0.05 Pa or more, and further preferably 0.1 Pa or more. The phase angle of the conductive material dispersion is preferably 19° or more, more preferably 30° or more, and further preferably 45° or more. The phase angle of the conductive material dispersion is preferably 90° or less, more preferably 85° or less, and further preferably 80° or less. The complex elastic modulus and the phase angle can be measured by the methods described in examples.

<Binder Resin-Containing Conductive Material Dispersion>

The binder resin-containing conductive material dispersion contains a binder resin and the conductive material dispersion. That is, the binder resin-containing conductive material dispersion contains at least the dispersant, the solvent, the conductive material, and the binder resin. In other words, the binder resin-containing conductive material dispersion contains at least Copolymer I, the solvent, the conductive material, and the binder resin, and may further contain any component such as a base and an acid. The binder resin-containing conductive material dispersion can be produced by mixing the binder resin and the conductive material dispersion. Any component may be further mixed with the binder resin and the conductive material dispersion. In the present specification, the "conductive material dispersion" and the "binder resin-containing conductive material dispersion" may be collectively referred to as "conductive material dispersion".

The binder resin is a resin capable of bonding substances such as an electrode active material and a conductive material. In the present specification, the binder resin is different from Copolymer I. That is, the binder resin is selected from the resins excluding Copolymer I. The binder resin may be, for example, a polymer or a copolymer including ethylene, propylene, vinyl chloride, vinyl acetate, vinyl alcohol, maleic acid, acrylic acid, acrylic acid ester, methacrylic acid, methacrylic acid ester, acrylonitrile, styrene, vinyl butyral, vinyl acetal, vinyl pyrrolidone and the like as a structural unit; a resin such as a polyurethane resin, a polyester resin, a phenol resin, an epoxy resin, a phenoxy resin, an urea resin, a melamine resin, an alkyd resin, an acrylic resin, a formaldehyde resin, a silicone resin, a fluororesin, and the like; a cellulose resin such as carboxymethyl cellulose; a rubber such as a styrene-butadiene rubber and a fluororubber; a conductive resin such as polyaniline and polyacetylene; and the like. In addition, the binder resin may also be a modified product, a mixture, or a copolymer of the above resins. Among the above, when the binder resin is used for a positive electrode film, a polymer or copolymer having a fluorine atom in the molecule, such as polyvinylidene fluoride, polyvinyl fluoride, tetrafluoroethylene, and the like, is preferable in terms of resistance. In addition, when the binder resin is used for a negative electrode film, carboxymethyl cellulose, styrene butadiene rubber, polyacrylic acid and the like having good adhesion are preferable.

The weight-average molecular weight of the binder resin is preferably 10,000 to 2,000,000, more preferably 100,000 to 1,000,000, and further preferably 200,000 to 1,000,000.

The content of Copolymer I contained in the binder resin-containing conductive material dispersion is preferably 0.1 to 200 mass %, more preferably 1 to 100 mass %, and further preferably 2 to 50 mass % based on the mass of the conductive material (taking the mass of the conductive material as 100 mass %).

The content of the conductive material contained in the binder resin-containing conductive material dispersion is preferably 0.05 to 30 mass %, and more preferably 0.1 to 20 mass % based on the mass of the conductive material dispersion (taking the mass of the conductive material dispersion as 100 mass %).

The content of the binder resin contained in the binder resin-containing conductive material dispersion is preferably 0.05 to 25 mass %, and more preferably 0.1 to 15 mass % based on the mass of the conductive material dispersion (taking the mass of the conductive material dispersion as 100 mass %).

The binder resin-containing conductive material dispersion includes a solvent. The solvent is not particularly limited; for example, the solvent exemplified in the description of the dispersant composition can be used. In addition, it is preferable to use the same solvent as the solvent contained in the dispersant composition.

<Slurry for Electrode Film>

The slurry for electrode film contains the conductive material dispersion or the binder resin-containing conductive material dispersion and an electrode active material. That is, the slurry for electrode film contains at least the conductive material dispersion and the electrode active material, or at least the binder resin-containing conductive material dispersion and the electrode active material. In other words, the slurry for electrode film contains at least Copolymer I, the conductive material, the solvent, and the electrode active material, and may further contain any component such as a binder resin, a base and an acid. In the present specification, the "slurry" may be referred to as "mixture slurry".

The electrode active material is a material that is a base for battery reaction. The electrode active material is classified into a positive electrode active material and a negative electrode active material based on electromotive force.

The positive electrode active material is not particularly limited and may be a material capable of reversibly doping or intercalating lithium ions. For example, the positive electrode active material may be a metal compound such as a metal oxide, a metal sulphide and the like. Specifically, the positive electrode active material may be an inorganic compound such as an oxide of a transition metal such as Fe, Co, Ni, and Mn, a composite oxide with lithium, a transition metal sulfide, and the like. Specifically, the positive electrode active material may be a powder of a transition metal oxide such as MnO, $V_2O_5$, $V_6O_{13}$, and $TiO_2$; a powder of a composite oxide of lithium and a transition metal such as lithium nickel oxide, lithium cobalt oxide, and lithium manganate having a layered structure, and lithium manganate having a spinel structure; a lithium iron phosphate material which is a phosphate compound having an olivine structure; a powder of a transition metal sulfide such as $TiS_2$ and FeS; and the like. The positive electrode active material is preferably a material containing at least Ni. The positive electrode active material can be used independently or in combination of two or more.

A material capable of reversibly doping or intercalating lithium ions can be used as the negative electrode active material. For example, the negative electrode active material may be metallic Li and an alloy of Li such as tin alloy, silicon alloy, lead alloy; a metal oxide such as $Li_xFe_2O_3$, $Li_xFe_3O_4$, $Li_xWO_2$ (x is a number of $0<x<1$), lithium titanate, lithium vanadate and lithium silicate; a conductive polymer such as polyacetylene and poly-p-phenylene; carbonaceous powder such as an artificial graphite like a highly graphitized carbon material and natural graphite; a carbon-based material such as a resin-calcinated carbon material. The negative electrode active material can be used independently or in combination of two or more.

The content of Copolymer I in the slurry for electrode film is preferably 0.01 to 10 mass %, and more preferably 0.05 to 5 mass % based on the mass of the electrode active material (taking the mass of the electrode active material as 100 mass %).

The content of the conductive material in the slurry for electrode film is preferably 0.01 to 10 mass %, more preferably 0.02 to 5 mass %, and further preferably 0.03 to 3 mass % based on the mass of the electrode active material (taking the mass of the electrode active material as 100 mass %).

When the slurry for electrode film contains a binder resin, the content of the binder resin in the slurry for electrode film is preferably 0.1 to 30 mass %, more preferably 0.5 to 20 mass %, and further preferably 1 to 10 mass % based on the mass of the electrode active material (taking the mass of the electrode active material as 100 mass %).

The solid content of the slurry for electrode film of the present embodiment is preferably 30 to 90 mass %, more preferably 30 to 80 mass %, and further preferably 40 to 75 mass % based on the mass of the slurry for electrode film (taking the mass of the slurry for electrode film as 100 mass %).

The slurry for electrode film can be produced by various conventionally known methods. The methods include a method of producing the slurry for electrode film by adding an electrode active material to the conductive material dispersion; a method of producing the slurry for electrode film by adding a binder resin to the conductive material dispersion and then adding an electrode active material; a method of producing the slurry for electrode film by adding an electrode active material to the conductive material dispersion and then adding a binder resin; a method of producing the slurry for electrode film by adding an electrode active material to the binder resin-containing conductive material dispersion; and the like.

The method for producing the slurry for electrode film is preferably the method in which a binder resin is added to the conductive material dispersion and then an electrode active material is further added and dispersed. The dispersion device used for dispersion is not particularly limited. The slurry for electrode film can be obtained by using the dispersing devices mentioned in the description of the conductive material dispersion. Because Copolymer I can also function as a binder, the slurry for electrode film can be obtained without adding a binder resin. Therefore, the method for producing the slurry for electrode film is also preferably the method in which an electrode active material is added and dispersed without adding a binder resin to the conductive material dispersion.

<Electrode Film>

The electrode film includes at least one film selected from the group consisting of a film formed by using the conductive material dispersion, a film formed by using the binder resin-containing conductive material dispersion, and a film formed by using the slurry for electrode film. The electrode film may further include a current collector. For example, the electrode film can be obtained by applying the slurry for electrode film on a current collector and drying the slurry, and includes the current collector and the film. In the present specification, the "film formed by using the slurry for electrode film" may be referred to as the "electrode mixture layer".

The material and the shape of the current collector used for forming the electrode film are not particularly limited, and the material and the shape suitable for various secondary batteries can be appropriately selected. For example, the material of the current collector may be a metal or an alloy, such as aluminum, copper, nickel, titanium, stainless, and the like. In addition, as for the shape, a foil on a flat sheet is typically used, and a current collector having a roughened surface, a perforated foil-shaped current collector, or a mesh current collector can also be used.

The method for applying the conductive material dispersion, the binder resin-containing conductive material dispersion, or the slurry on the current collector is not particularly limited, and a known method can be used. Specifically, the method may be a die coating method, a dip coating method, a roll coating method, a doctor coating method, a knife coating method, a spray coating method, a gravure coating method, a screen printing method, an electrostatic coating method, and the like. The drying method may include, but is not particularly limited to, natural drying or drying using a fan dryer, a warm air dryer, an infrared heater, a far infrared heater and the like.

After coating, a rolling treatment using a lithographic press, a calendar roll or the like may be performed. The thickness of the resultant film is, for example, 1 μm or more and 500 μm or less, and preferably 10 μm or more and 300 μm or less.

The film formed by using the conductive material dispersion or the binder resin-containing conductive material dispersion may also be used as a base layer of the electrode mixture layer to improve the adhesion between the electrode mixture layer and the current collector or to enhance the conductivity of the electrode film.

<Non-Aqueous Electrolyte Secondary Battery>

The non-aqueous electrolyte secondary battery includes a positive electrode, a negative electrode, and an electrolyte, and at least one electrode selected from the group consisting of the positive electrode and the negative electrode includes the electrode film.

As the positive electrode, for example, an electrode film formed by applying the slurry for electrode film containing a positive electrode active material on the current collector and drying the slurry to form a film can be used.

As the negative electrode, for example, an electrode film formed by applying the slurry for electrode film containing a negative electrode active material on a current collector and drying the slurry to form a film can be used.

The electrolyte may include various conventionally known electrolytes in which ions are capable of moving. The electrolyte may include, but is not limited to, for example, $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, $LiI$, $LiBr$, $LiCl$, $LiAlCl$, $LiHF_2$, $LiSCN$, $LiBPh_4$ (wherein, Ph is a phenyl group) and the like, which contain a lithium salt. Preferably, the electrolyte is dissolved in a non-aqueous solvent and used as an electrolytic solution.

The non-aqueous solvent is not particularly limited and may be, for example, a carbonate solvent such as ethylene carbonate, propylene carbonate, butylene carbonate, dimethyl carbonate, ethylmethyl carbonate, and diethyl carbonate; a lactone solvent such as γ-butyrolactone, γ-valerolactone, and γ-octanoic lactone; a glyme solvent such as tetrahydrofuran, 2-methyltetrahydrofuran, 1,3-dioxolane, 4-methyl-1,3-dioxolane, 1,2-methoxyethane, 1,2-ethoxyethane, and 1,2-dibutoxyethane; an ester solvent such as methyl formate, methyl acetate, and methyl propionate; a sulfoxide solvent such as dimethyl sulfoxide and sulfolane; and a nitrile solvent such as acetonitrile. These solvents may be used independently or in combination of two or more.

The non-aqueous electrolyte secondary battery preferably includes a separator. The separator may include, but is not limited to, polyethylene non-woven fabric, polypropylene non-woven fabric, polyamide non-woven fabric and non-woven fabric obtained by subjecting the above fabric to a hydrophilic treatment.

The structure of the non-aqueous electrolyte secondary battery of the present embodiment is not particularly limited, and generally includes a positive electrode and a negative electrode, and a separator as necessary, and the shape may be a paper shape, a cylindrical shape, a button shape, a laminated shape and the like corresponding to the intended purpose.

EXAMPLES

Hereinafter, the present invention is described more specifically with reference to examples. The present invention is not limited to the following examples as long as it is within the spirit of the present invention. Moreover, unless otherwise mentioned, "part" represents "part by mass" and "%" represents "mass %". In addition, in the examples, "Copolymer I" may be referred to as "dispersant", and the composition containing the copolymer and the solvent (for example, Examples 1-13) may also be referred to as "dispersant-containing liquid (dispersant composition)".

<Preparation of Sample for Measuring Weight-Average Molecular Weight (Mw)>

The copolymer is separated and collected from the dispersant-containing liquid (dispersant composition) containing the copolymer, the base and the solvent by the following method to obtain a measurement sample. The dispersant-containing liquid is dripped into purified water to precipitate the copolymer, and the precipitate is collected by filtering with a Buchner funnel. The precipitate is directly sprinkled and rinsed with purified water on the Buchner funnel, and then dissolved in tetrahydrofuran (THF) to obtain a solution. The obtained solution is dripped again into purified water, filtered and rinsed with purified water, and the precipitate is redissolved in THF to obtain a measurement sample. In addition, the conductive material is separated by centrifugation from the conductive material dispersion containing the copolymer, the base, the solvent, and the conductive material, then the separated supernatant is subjected to the same steps as above and a measurement sample is prepared.

<Measurement of Weight-Average Molecular Weight (Mw)>

The weight-average molecular weight (Mw) of the copolymer is measured by a gel permeation chromatograph (GPC) equipped with a RI detector. HLC-8320GPC (manufactured by Tosoh Corporation) is used as the device, three separation columns are connected in series and "TSK-GEL SUPER AW-4000", "AW-3000" and "AW-2500" manufactured by Tosoh Corporation are used as fillers in order. N,N-dimethylformamide solution of 30 mM of triethylamine and 10 mM of LiBr is used as an eluent, and the measurement is performed under an oven temperature of 40° C. and a flow rate of 0.6 mL/min. The concentration of the measurement sample is adjusted to 1% using a solvent consisting of the above eluent, and 20 microliters of the measurement sample is injected. The weight-average molecular weight is a polystyrene equivalent value.

<Measurement of Viscosity of Copolymer Solution and Dispersant-Containing Liquid>

The copolymer is dissolved into a solution which uses NMP as a solvent and has a concentration of 8%, and the obtained solution is used as a viscosity measurement sample. The dispersant-containing liquid (dispersant composition) is diluted with NMP into a solution having a concentration of 8% to prepare a viscosity measurement sample. The viscosity measurement sample is set on a sample table, and the viscosity is continuously measured, at a temperature of 25° C. and a shear stress of 1/s to 1,000/s, by using a rheometer (RheoStress1 rotary rheometer manufactured by Thermo Fisher Scientific Co., Ltd.) at a cone having a diameter of 60 mm and an angle of 2°.

<Infrared Spectroscopic Analysis by Attenuated Total Reflection>

The solid copolymer is directly used for measurement. The dispersant-containing liquid (dispersant composition) is treated with hot air of 100° C. for 10 hours to be sufficiently dried, and the obtained solid copolymer is used as a measurement sample. The IR of the measurement sample is measured by using an infrared spectrophotometer (Nicolet iS5 FT-IR spectrometer manufactured by Thermo Fisher Scientific Co., Ltd.).

<Measurement of Hydrogenation Rate of Copolymer>

The hydrogenation rate is obtained by performing an IR measurement with the same method as the infrared spectroscopic analysis by the attenuated total reflection. The double bond derived from the conjugated diene monomer unit has a peak at 970 $cm^{-1}$, the hydrogenated single bond has a peak at 723 $cm^{-1}$, and the hydrogenation rate is calculated from the ratio of the heights of the two peaks.

<Measurement of Content of Amide Group-Containing Structural Unit>

When the amide group-containing structural unit is introduced into the copolymer by hydrolyzing the nitrile group-containing structural unit, the content of the amide group-containing structural unit is obtained by calculating the modification rate (molar ratio) of the nitrile group by the formula [A]/([A]+[B]) from $^{13}$C-NMR quantitative spectrum measured by a nuclear magnetic resonance apparatus (ADVANCE400Nanobay: manufactured by Bruker Japan Co. Ltd., using $CDCl_3$ as a measurement solvent, and using a NMR tube of 10 mm), and converting the modification rate into the composition ratio (mass %) in the whole copolymer. The "amount of amide group" in the table described later means "the content (mass %) of the amide group-containing structural unit".

[A]: peak area at a chemical shift value of 180.5-183.5 ppm

[B]: peak area at a chemical shift value of 121.5-123.0 ppm

However, $^{13}$C-NMR measurement has low quantitative sensitivity, and thus the content cannot be detected when the content of the amide group-containing structural unit is less than 1%. Accordingly, for the copolymer in which peaks at about 1570 $cm^{-1}$ and about 1650 $cm^{-1}$ derived from the amide group can be detected by IR measurement with the same method as the infrared spectroscopic analysis by the attenuated total reflection, it is determined that an amide group-containing structural unit is contained in the copolymer, and the content of the amide group-containing structural unit is less than 1%. Moreover, because the peak can be detected by IR measurement as described above, it can be determined that the content of the amide group-containing structural unit is 0.3% or more. In addition, when the amide group-containing structural unit is introduced through the method of preparing a copolymer by using a monomer composition containing the amide group-containing monomer, the content of the amide group-containing structural unit cannot be quantified either when the content is less than 1%, and thus the content is seen as less than 1%. When the content is 1% or more, the ratio of the nitrile group-containing structural unit and the amide group-containing structural unit is confirmed by $^{13}$C-NMR quantitative spectrum. For the copolymer containing 1% or more of the amide group-containing structural unit, it is confirmed that the content is the same as the content calculated from the feed amount of the monomer at the time of synthesis.

<Measurement of Content of Carboxyl Group-Containing Structural Unit>

Similar to the measurement of the content of the amide group-containing structural unit, the content of the carboxyl group-containing structural unit can be generally obtained from the $^{13}$C-NMR quantitative spectrum measured by a nuclear magnetic resonance apparatus. However, the quantification is difficult when the content of the carboxyl group-containing structural unit is less than 1%. Thus, with the same method as the infrared spectroscopic analysis by the attenuated total reflection, a peak at about 1710 $cm^{-1}$ derived from the C=O stretching vibration is detected by IR measurement, and a peak at about 1570 $cm^{-1}$ derived from the amide group is reduced. Based on this fact, it is determined that a part of the amide group is hydrolyzed and a carboxyl group is introduced into the copolymer, and the copolymer contains a carboxyl group-containing structural unit. Moreover, because the peak can be detected by IR measurement as described above, it can be determined that the content of the carboxyl group-containing structural unit is 0.3% or more.

<Measurement of Moisture of Mixture>

The moisture of the mixture is calculated by using a Karl Fischer moisture meter (tabletop coulometry moisture meter CA-200 type: manufactured by Mitsubishi Chemical Analytech Co., Ltd.) to measure the sample by the Fischer method at a temperature of 230° C. and a nitrogen gas flow of 250 mL/min, and calculating the value as the content with respect to the total mass of the copolymer, the base, and the solvent.

<Measurement of Initial Viscosity of Conductive Material Dispersion>

The measurement of the viscosity value is performed by using a B-type viscometer ("BL" manufactured by Toki Sangyo Co., Ltd.) at a rotation speed of 60 rpm of the B-type viscometer rotor immediately after the conductive material dispersion is sufficiently stirred with a spatula under a temperature of 25° C. of the conductive material dispersion. The rotor used for measurement is rotor No. 1 when the viscosity value is less than 100 mPa·s, rotor No. 2 when the viscosity value is 100 mPa·s or more and less than 500 mPa·s, rotor No. 3 when the viscosity value is 500 mPa·s or more and less than 2,000 mPa·s, and rotor No. 4 when the viscosity value is 2,000 mPa·s or more and less than 10,000 mPa·s. The lower the viscosity, the better the dispersibility becomes, and the higher the viscosity, the poorer the dispersibility becomes. When the obtained conductive material dispersion is obviously separated or settled, the dispersibility is poor.

Determination criteria
⊚: less than 500 mPa·s (excellent)
○: 500 mPa·s or more and less than 2,000 mPa·s (good)
Δ: 2,000 mPa·s or more and less than 10,000 mPa·s (fair)
x: 10,000 mPa·s or more, settled or separated (poor)

<Measurement of Complex Elastic Modulus and Phase Angle of Conductive Material Dispersion>

The complex elastic modulus and the phase angle of the conductive material dispersion are evaluated by using a rheometer (RheoStress1 rotary rheometer manufactured by Thermo Fisher Scientific Co., Ltd.) at a cone having a diameter of 60 mm and an angle of 2° to perform dynamic viscoelasticity measurement at a temperature of 25° C. and a frequency of 1 Hz in a strain rate range of 0.01% to 5%. The smaller the obtained complex elastic modulus, the better the dispersibility becomes, and the larger the obtained complex elasticity, the poorer the dispersibility becomes. In addition, the larger the obtained phase angle, the better the dispersibility becomes, and the smaller the obtained phase angle, the poorer the dispersibility becomes.

Determination Criteria for Complex Elastic Modulus
⊚: less than 5 Pa (excellent)
○: 5 Pa or more and less than 20 Pa (fair)
x: 20 Pa or more (poor)
xx: 100 Pa or more (extremely poor)

Determination criteria for phase angle
⊚: 45° or more (excellent)
○: 30° or more and less than 45° (good)
Δ: 19° or more and less than 30° (fair)
x: less than 19° (poor)

<Stability Evaluation of Conductive Material Dispersion>

The storage stability is evaluated based on the change in liquid properties after the conductive material dispersion is kept still and stored at 50° C. for 7 days. The change in the liquid properties is determined from the ease of stirring during the stirring with a spatula.

Determination Criteria
○: no problems (good)
Δ: viscosity increased but not gelled (fair)
x: gelled (extremely poor)

<Evaluation of Conductivity of Positive Electrode Mixture Layer>

The mixture slurry for positive electrode is applied to a PET film (thickness: 100 μm) by using an applicator having a gap of 175 μm, dried in a hot air oven at 70° C. for 10 minutes, and then dried in the hot air oven at 120° C. for 15 minutes to obtain a positive electrode film for conductivity evaluation. The surface resistivity (Ω/□) of the positive electrode mixture layer is measured by using Lorester GP, MCP-T610 manufactured by Mitsubishi Chemical Analytech Co., Ltd. After the measurement, the volume resistivity (Ω cm) is obtained by multiplying the surface resistivity by the thickness of the positive electrode mixture layer formed on the PET film. The thickness of the positive electrode mixture layer is obtained by using a film thickness meter (DIGIMICRO MH-15M manufactured by NIKON Co., Ltd.) to measure three points in the positive electrode film to obtain the average value of the positive electrode film, and subsequently calculating the difference between the average value of the positive electrode film and the film thickness of the PET film.

Determination Criteria
⊚: volume resistivity (Ω cm) of the positive electrode mixture layer is less than 10 (excellent)
○: volume resistivity (Ω cm) of the positive electrode mixture layer is 10 or more and less than 20 (good)
x: volume resistivity (Ω cm) of the positive electrode mixture layer is 20 or more (poor)

<Scanning Electron Microscope Observation of Surface of Positive Electrode Film>

The surface of the positive electrode film is observed by using a scanning electron microscope (SEM), that is, JSM-6700F manufactured by JEOL Ltd. The positive electrode film obtained by the same method as in the evaluation of the conductivity of the positive electrode mixture layer is cut into a square having a side length of 5 mm with a razor, and subsequently attached to a sample table by using a carbon tape to obtain an observation sample. The conductive material being a nanomaterial is extremely small in size compared with the particles of the electrode active material, and thus the distribution state of each material can be determined depending on the size difference between the materials.

Determination Criteria
⊚: a state that the surface is uniform on the whole and has no aggregate or unevenness (excellent)
x: a state that aggregate or unevenness exists (poor)

<Evaluation of Rate Characteristic of Non-Aqueous Electrolyte Secondary Battery>

The non-aqueous electrolyte secondary battery is arranged inside a thermostatic chamber having a temperature of 25° C., and charge/discharge measurement is performed using a charge/discharge device (SM-8 manufactured by Hokuto Denko KK). Constant-current constant-voltage charging (cut-off current: 1 mA (0.02C)) is performed at a charging current of 10 mA (0.2C) and an end-of-charge voltage of 4.3 V. Subsequently, constant current discharge is performed at a discharge current of 10 mA (0.2C) and an end-of-discharge voltage of 3 V. After repeating this operation three times, constant-current constant-voltage charging (cutoff current (1 mA (0.02C)) is performed at the charging current of 10 mA (0.2C) and the end-of-charge voltage of 4.3V, constant-current discharge is performed at the discharge currents of 0.2C and 3C respectively until the end-of-discharge voltage reaches 3.0 V, and the discharge capacities are obtained. The rate characteristic is a ratio of the discharge capacity at 0.2C and the discharge capacity at 3C and can be represented by the following Formula 1.

$$\text{Rate characteristic} = \text{discharge capacity at 3C/third discharge capacity at 0.2C} \times 100 (\%) \quad \text{(Formula 1)}$$

Determination criteria
⊚: rate characteristic is 80% or more (excellent)
○: rate characteristic is 60% or more and less than 80% (good)
x: rate characteristic is 30% or more and less than 60% (poor)
xx: rate characteristic is less than 30% (extremely poor)

<Method for Evaluating Cycle Characteristic of Non-Aqueous Electrolyte Secondary Battery>

The non-aqueous electrolyte secondary battery is arranged inside a thermostatic chamber having a temperature of 25° C., and charge/discharge measurement is performed using a charge/discharge device (SM-8 manufactured by Hokuto Denko KK). Constant-current constant-voltage charging (cut-off current: 2.5 mA (0.05C)) is performed at a charging current of 25 mA (0.5C) and an end-of-charge voltage of 4.3 V. Subsequently, constant current discharge is performed at a discharge current of 25 mA (0.5C) and an end-of-discharge voltage of 3 V. This operation is repeated 200 times. The rate characteristic is a ratio of the third discharge capacity at 0.5C and the 200th discharge capacity at 0.5C at 25° C. and can be represented by the following Formula 2.

Cycle characteristic=third discharge capacity at 0.5C/ 200th discharge capacity at 0.5C×100(%)   (Formula 2)

Determination criteria

⊚: cycle characteristic is 85% or more (excellent)
○: cycle characteristic is 80% or more and less than 85% (good)
x: cycle characteristic is 60% or more and less than 80% (poor)
xx: cycle characteristic is less than 60% (extremely poor)

Synthesis Example 1 Production of Copolymer 1

30 parts of acrylonitrile, 70 parts of 1,3-butadiene, 3 parts of potassium oleate, 0.3 part of azobisisobutyronitrile, 0.6 part of t-dodecyl mercaptan and 200 parts of ion-exchanged water are added to a stainless steel polymerization reactor. Polymerization is performed at 45° C. for 20 hours while stirring in a nitrogen atmosphere and is completed at a conversion rate of 90%. Unreacted monomer is removed by reduced pressure stripping, and an acrylonitrile-conjugated diene rubber latex having a solid content concentration of about 30% is obtained. Subsequently, ion-exchanged water is added to the latex to adjust the total solid content concentration to 12%, the mixture is put into an autoclave having a volume of 1 L and equipped with a stirrer, and nitrogen gas is flowed for 10 minutes to remove dissolved oxygen in the contents. 75 mg of palladium acetate as a hydrogenation catalyst is dissolved in 180 mL of ion-exchanged water containing 4 times the molar amount of nitric acid with respect to palladium, and the prepared catalyst solution is added to the autoclave. After the interior of the autoclave is substituted twice with hydrogen gas, the contents of the autoclave are heated to 50° C. while being pressurized with hydrogen gas to 3 MPa, and the hydrogenation reaction is performed for 6 hours. Subsequently, after the contents are returned to room temperature and the interior of the autoclave is made into a nitrogen atmosphere, the solid content is dried to collect Copolymer 1. The hydrogenation rate of Copolymer 1 is 99.5% and the weight-average molecular weight (Mw) is 200,000. In the acrylonitrile-conjugated diene rubber, the content of the conjugated diene monomer unit is 70% and the content of the nitrile group-containing monomer unit is 30% based on the mass of the acrylonitrile-conjugated diene rubber. In addition, in Copolymer 1, the content of the aliphatic hydrocarbon structural unit containing the alkylene structural unit is 70% and the content of the nitrile group-containing monomer unit is 30% based on the mass of Copolymer 1. The content of the monomer units and the content of the structural units are obtained from the amount of the monomer that is used (the same applies hereinafter).

Example 1-1 Production of Dispersant 1

16 parts of NaOH and 84 parts of NMP are added to a stainless steel container 1 and stirred with a homogenizer for 1 hour to prepare a NaOH suspension. 9 parts of Copolymer 1 obtained in Synthesis Example 1 and 91 parts of NMP are added to a stainless steel container 2 and stirred with a homogenizer for 1 hour to prepare a solution of Copolymer 1. Subsequently, the NaOH suspension and the solution of Copolymer 1 are put into a stainless steel container 3, NMP is further added to adjust the concentration so that NaOH and Copolymer 1 have the composition shown in Table 1, and a mixture is obtained. The moisture of the mixture is 0.1%. The mixture is stirred with a homogenizer for 2 hours to modify a part of the nitrile group of Copolymer 1 into an amide group, and a Dispersant 1-containing liquid (dispersant composition) containing the copolymer being the Dispersant 1 (in the example, the modified copolymer 1 may be referred to as "Dispersant 1"), NMP and NaOH is obtained. The content and the weight-average molecular weight (Mw) of the amide group-containing structural unit of Dispersant 1 are as shown in Table 1. In Dispersant 1, based on the mass of Dispersant 1, the content of the aliphatic hydrocarbon structural unit containing the alkylene structural unit is 70%, the content of the nitrile group-containing monomer unit is more than 29% and less than 30%, and the content of the amide group-containing structural unit is less than 1%. The contents of these structural units are obtained by using the amount of the monomer that is used, NMR (nuclear magnetic resonance) and/or IR (infrared spectroscopy) measurement (the same applies hereinafter).

Synthesis Example 2 Production of Copolymer 2

Copolymer 2 is obtained in the same manner as in Synthesis Example 1, except that the monomer used is changed to 20 parts of acrylonitrile, 40 parts of 1,3-butadiene, and 40 parts of 2-methyl-1,3-butadiene. The hydrogenation rate of Copolymer 2 is 99.0% and the weight-average molecular weight (Mw) is 300,000. In Copolymer 2, the content of the aliphatic hydrocarbon structural unit containing the alkylene structural unit is 80% and the content of the nitrile group-containing monomer unit is 20% based on the mass of Copolymer 2.

Example 1-2 Production of Dispersant 2

A Dispersant 2-containing liquid is obtained in the same manner as in Example 1-1, except that the copolymer used is changed to Copolymer 2. The moisture of the mixture of the NaOH suspension and the Copolymer 2-containing solution is 1.0%. The content and the weight-average molecular weight (Mw) of the amide group-containing structural unit of Dispersant 2 are as shown in Table 1. In Dispersant 2, based on the mass of Dispersant 2, the content of the aliphatic hydrocarbon structural unit containing the alkylene structural unit is 80%, the content of the nitrile group-containing monomer unit is more than 19% and less than 20%, and the content of the amide group-containing structural unit is less than 1%.

Moreover, the abbreviations in the columns of monomer and base in Table 1 and Table 2 described later refer to the following.

BD: 1,3-butadiene
MBD: 2-methyl-1,3-butadiene
AN: acrylonitrile
AAm: acrylamide
MAAm: methacrylamide
DMAAm: N,N-dimethylacrylamide
AA: acrylic acid
Choline: trimethyl-2-hydroxyethyl ammonium hydroxide
TMAH: tetramethyl ammonium hydroxide Examples 1-3 to 1-8 Production of Dispersants 3 to 8

Liquids containing Dispersants 3 to 8 are obtained respectively in the same manner as in Example 1-1, except that the type and/or the amount of the base used are changed according to Table 1. The content and the weight-average molecular weight (Mw) of the amide group-containing structural unit of each dispersant are as shown in Table 1.

Examples 1-9 Production of Dispersant 9

H-NBR1 (H-NBR (hydrogenated acrylonitrile-butadiene rubber) Therban® 3406 manufactured by LANXESS Co., Ltd., acrylonitrile content: 34%), NaOH, and NMP are added to a glass bottle (M-225, manufactured by Kashiwa Glass Co., Ltd.) according to Table 1, and zirconia beads (bead diameter: 0.5 mmϕ) are used as a medium and mixed with a paint conditioner to modify a part of the nitrile group into an amide group to obtain a Dispersant 9-containing liquid. The content and the weight-average molecular weight (Mw) of the amide group-containing structural unit of Dispersant 9 are as shown in Table 1.

Examples 1-10 Production of Dispersant 10

H-NBR2 (H-NBR (hydrogenated acrylonitrile-butadiene rubber) Zetpole® 3300 manufactured by Nippon Zeon Co., Ltd., acrylonitrile content: 23.6%), LiOH, and NMP are added to a glass bottle (M-225, manufactured by Kashiwa Glass Co., Ltd.) according to Table 1, and zirconia beads (bead diameter: 0.5 mmϕ) are used as a medium and mixed with a paint conditioner to modify a part of the nitrile group into an amide group to obtain a Dispersant 10-containing liquid. The content and the weight-average molecular weight (Mw) of the amide group-containing structural unit of Dispersant 10 are as shown in Table 1.

Examples 1-11 Production of Dispersant 11

The Dispersant 1-containing liquid prepared in Example 1-1 is dripped into purified water and precipitated, and the precipitate is collected by filtering with a Buchner funnel. Subsequently, the precipitate collected on the Buchner funnel is sprinkled and rinsed with purified water, and then dissolved in tetrahydrofuran (THF) to obtain a solution. The obtained solution is dripped again into purified water, filtered and rinsed with purified water, and NaOH is extracted and removed from the precipitate. The precipitate is dried with hot air at 60° C. to obtain Dispersant 11 from which NaOH is removed.

Examples 1-12 Production of Dispersant 12

Citric acid is further added to the Dispersant 1-containing liquid prepared in Example 1-1 in an amount of 5% with respect to Dispersant 1 (Copolymer 1) to modify a part of the amide group into a carboxyl group. The presence of carboxyl groups is confirmed through an infrared spectroscopic analysis by attenuated total reflection. It is determined that Dispersant 12 includes a carboxyl group-containing structural unit.

Example 1-13 Production of Dispersant 13

34.5 parts of acrylonitrile, 65 parts of 1,3-butadiene, 0.5 part of acrylamide, 3 parts of potassium oleate, 0.3 part of azobisisobutyronitrile, 0.6 part of t-dodecyl mercaptan and 200 parts of ion-exchanged water are added to a stainless steel polymerization reactor. Polymerization is performed at 45° C. for 20 hours while stirring in a nitrogen atmosphere and is completed at a conversion rate of 90%. Unreacted monomer is removed by reduced pressure stripping, and an amide group-containing acrylonitrile-conjugated diene rubber latex having a solid content concentration of about 30% is obtained. Subsequently, ion-exchanged water is added to the latex to adjust the total solid content concentration to 12%, the mixture is added to an autoclave having a volume of 1 L and equipped with a stirrer, and nitrogen gas is flowed for 10 minutes to remove dissolved oxygen in the contents. 75 mg of palladium acetate as a hydrogenation catalyst is dissolved in 180 mL of ion-exchanged water containing 4 times the molar amount of nitric acid with respect to palladium, and the prepared catalyst solution is added to the autoclave. After the interior of the autoclave is substituted twice with hydrogen gas, the contents of the autoclave are heated to 50° C. while being pressurized with hydrogen gas to 3 MPa, and the hydrogenation reaction is performed for 6 hours. Subsequently, after the contents are returned to room temperature and the interior of the autoclave is made into a nitrogen atmosphere, the solid content is dried to collect Dispersant 13. The hydrogenation rate of Dispersant 13 is 99.5% and the weight-average molecular weight (Mw) is 200,000. In Copolymer 13 (Dispersant 13), based on the mass of Copolymer 13, the content of the aliphatic hydrocarbon structural unit containing the alkylene structural unit is 65%, the content of the nitrile group-containing monomer unit is 34.5%, and the content of the amide group-containing monomer unit is 0.5%.

Examples 1-14 to 1-16 Production of Dispersants 14 to 16

Dispersants 14 to 16 are obtained in the same manner as in Example 1-13 except that the monomer used and the composition thereof are changed according to Table 1. The hydrogenation rate is 98.5%, 98.0%, and 99.5% respectively.

FIG. 1 shows the IR spectra of Copolymer 1, Dispersant 1, and Dispersant 3. Comparing the IR spectra of Copolymer 1, Dispersant 1, and Dispersant 3, it can be confirmed that Dispersant 3 has sharp peaks derived from amide groups at about 1570 cm$^{-1}$ and about 1650 cm$^{-1}$, and Dispersant 1 also has peaks derived from amide groups, although the intensity is low. On the other hand, Copolymer 1 has no amide group, and thus no peak exists. The peak appearing at about 1690 cm$^{-1}$ in the vicinity is derived from the solvent NMP. Accordingly, it is confirmed that the amide group is definitely introduced into Dispersant 1 and Dispersant 3. It is determined that Dispersant 1 and Dispersant 3 contain an amide group-containing structural unit. In addition, the other dispersants are confirmed in the same manner.

Figure 2:
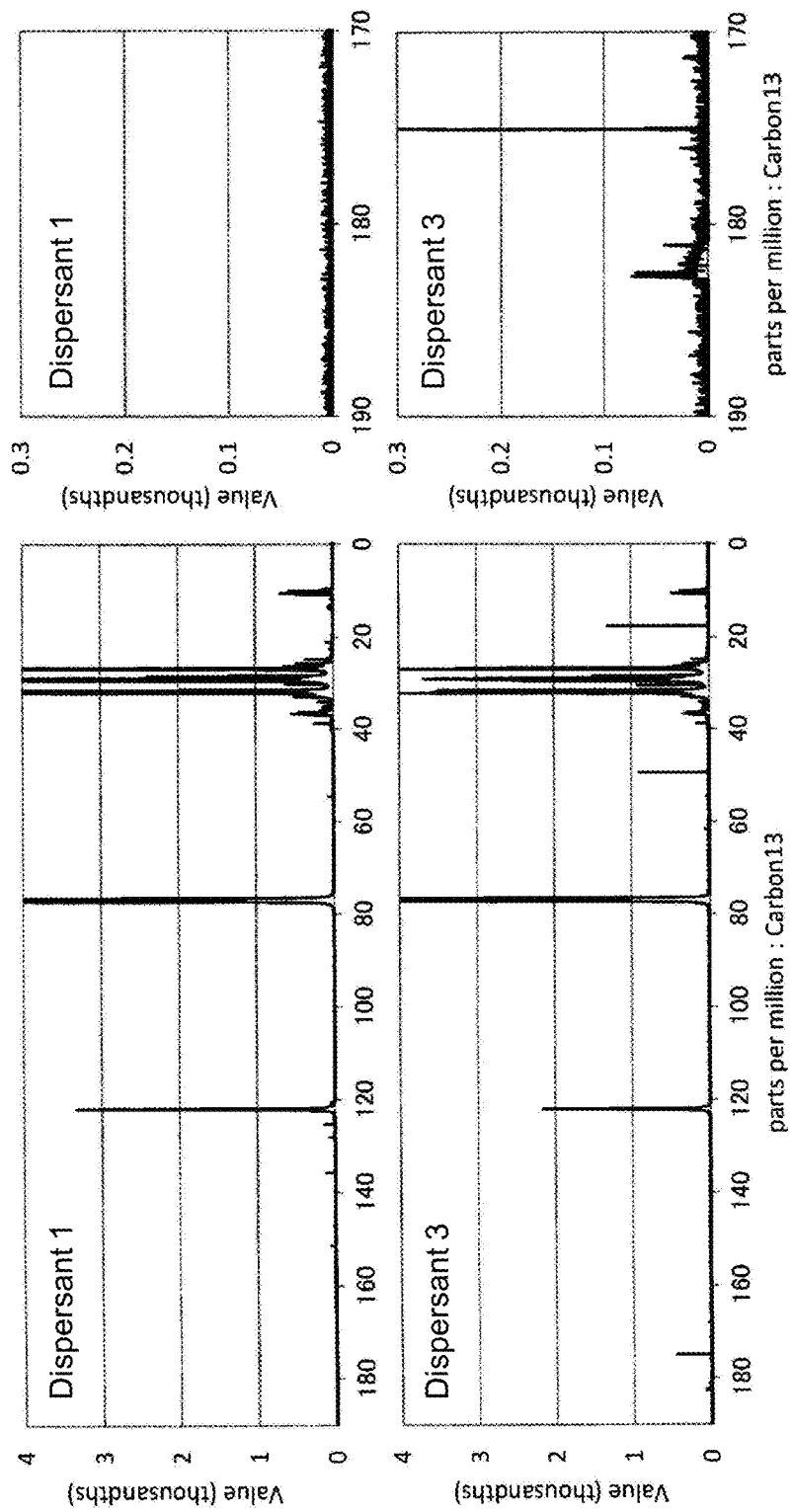
FIG. 2 is $^{13}$C-NMR quantitative spectra of Dispersant 1 and Dispersant 3 obtained by a nuclear magnetic resonance apparatus.

FIG. 2 shows $^{13}$C-NMR spectra of Dispersant 1 and Dispersant 3. The content of the amide group-containing structural unit and Dispersant 3 calculated from the $^{13}$C-NMR spectrum is less than 1% for Dispersant 1 and 3.0% for Dispersant 3.

(M-225, manufactured by Kashiwa Glass Co., Ltd.), or a dispersant is added, and NMP is further added to adjust the concentration, then the conductive material shown in Table

TABLE 1

|  |  | Modified copolymer | Monomer | | | | | | | Base type | Base amount relative to copolymer [%] | Amide group amount [%] | Weight-average molecular weight (Mw) |
| --- | --- | --- | --- | --- | --- | --- | --- | --- | --- | --- | --- | --- | --- |
|  |  |  | BD | MBD | AN | AAm | MAAm | DMAAm | AA |  |  |  |  |
| Example 1-1 | Dispersant 1 | Copolymer 1 | 70 |  | 30 |  |  |  |  | NaOH | 5 | <1 | 40,000 |
| Example 1-2 | Dispersant 2 | Copolymer 2 | 40 | 40 | 20 |  |  |  |  | NaOH | 5 | <1 | 40,000 |
| Example 1-3 | Dispersant 3 | Copolymer 1 | 70 |  | 30 |  |  |  |  | NaOH | 20 | 3 | 15,000 |
| Example 1-4 | Dispersant 4 | Copolymer 1 | 70 |  | 30 |  |  |  |  | LiOH | 5 | <1 | 30,000 |
| Example 1-5 | Dispersant 5 | Copolymer 1 | 70 |  | 30 |  |  |  |  | KOH | 5 | <1 | 40,000 |
| Example 1-6 | Dispersant 6 | Copolymer 1 | 70 |  | 30 |  |  |  |  | Mg(OH)$_2$ | 5 | <1 | 100,000 |
| Example 1-7 | Dispersant 7 | Copolymer 1 | 70 |  | 30 |  |  |  |  | Choline | 5 | <1 | 60,000 |
| Example 1-8 | Dispersant 8 | Copolymer 1 | 70 |  | 30 |  |  |  |  | TMAH | 5 | <1 | 40,000 |
| Example 1-9 | Dispersant 9 | H-NBR1 |  |  |  |  |  |  |  | NaOH | 5 | <1 | 50,000 |
| Example 1-10 | Dispersant 10 | H-NBR2 |  |  |  |  |  |  |  | NaOH | 5 | <1 | 20,000 |
| Example 1-11 | Dispersant 11 | Copolymer 1 | 70 |  | 30 |  |  |  |  | NaOH | 5 | <1 | 40,000 |
| Example 1-12 | Dispersant 12 | Copolymer 1 | 70 |  | 30 |  |  |  |  | NaOH | 5 | <1 | 40,000 |
| Example 1-13 | Dispersant 13 | — |  |  | 65 | 34.5 | 0.5 |  |  |  |  | <1 | 200,000 |
| Example 1-14 | Dispersant 14 | — |  |  | 65 | 32 |  | 3 |  |  |  | 3 | 100,000 |
| Example 1-15 | Dispersant 15 | — |  |  | 65 | 27 |  | 8 |  |  |  | 8 | 300,000 |
| Example 1-16 | Dispersant 16 | — |  |  | 65 | 34.2 | 0.5 |  | 0.3 |  |  | <1 | 200,000 |

The weight-average molecular weight of Dispersants 1 to 10 measured by gel permeation chromatography (GPC) is 0.05-0.6 time relative to that of the copolymer before introducing the amide group. In addition, the viscosity of each dispersant-containing liquid (dispersant composition) at a shear stress of 1,000/s is 0.05-0.6 time relative to the viscosity of the copolymer solution before introducing the amide group. Although the details are not clear, it is speculated that because the amide group can form a strong hydrogen bond, a crosslinked structure is formed by the hydrogen bond in the molecule, and thereby the apparent molecular weight (molecular weight measured under the conditions shown in the example) has become smaller. The reason of the significant decrease in the viscosity of the dispersant-containing liquid is considered to be the same.

Moreover, the mixing of the base and the copolymer is not limited to the order and the method described in the examples. When the base is dispersed (or dissolved) in the solvent in advance and then added to the copolymer solution, the contact efficiency between the base and the copolymer is high, and thus the hydrolysis easily proceeds. It is also effective in stabilizing quality control and shortening production time.

<Production of Conductive Material Dispersion>

Examples 2-1 to 2-18

According to the composition and the dispersion time shown in Table 2, a dispersant-containing liquid containing a dispersant, NMP and a base is added to a glass bottle (M-225, manufactured by Kashiwa Glass Co., Ltd.), NMP is further added, and zirconia beads (bead diameter: 1.25 mmφ) are used as a medium and dispersed by a paint conditioner to obtain the conductive material dispersions (Dispersions 1 to 18). NMP is added so that the total amount of all components contained in the conductive material dispersion is 100 parts (in Example 2-1, 97.2 parts of NMP is added).

Comparative Examples 2-1 to 2-5

According to the composition and the dispersion time shown in Table 2, a dispersant and an additive (aminoethanol or NaOH) as required are added to a glass bottle (M-225, manufactured by Kashiwa Glass Co., Ltd.), NMP is further added and mixed, then a conductive material 8S is added, and zirconia beads (bead diameter: 1.25 mmφ) is used as a medium and dispersed by a paint conditioner to obtain conductive material dispersions (Comparative dispersions 1 to 5).

Moreover, the abbreviations shown in Table 2 refer to the following.

8S: JENOTUBE8S (manufactured by JEIO Co., Ltd., multi-walled CNT, outer diameter: 6-9 nm)
100T: K-Nanos 100T (manufactured by Kumho Petrochemical Co., Ltd., multi-walled CNT, outer diameter: 10 to 15 nm)
HS-100: Denka Black HS-100 (manufactured by Denka Co., Ltd., acetylene black, average primary particle diameter: 48 nm, specific surface area: 39 m$^2$/g)
PVP: Polyvinyl pyrrolidone K-30 (manufactured by Nippon Shokubai Co., Ltd., solid content: 100%)
PVA: Kuraray POVAL PVA403 (manufactured by Kuraray Co., Ltd., solid content: 100%)

TABLE 2

| Example Comparative example | Conductive material dispersion | Conductive material | | Dispersant | | Base or other additives | | Dispersion time (hour) |
| --- | --- | --- | --- | --- | --- | --- | --- | --- |
|  |  | Type | Addition amount (part) | Type | Addition amount (part) | Type | Addition amount (part) |  |
| Example 2-1 | Dispersion 1 | 8S | 2 | Dispersant 1 | 0.8 | NaOH | 0.04 | 8 |
| Example 2-2 | Dispersion 2 | 8S | 2 | Dispersant 2 | 0.8 | NaOH | 0.04 | 8 |

TABLE 2-continued

| Example Comparative example | Conductive material dispersion | Conductive material Type | Addition amount (part) | Dispersant Type | Addition amount (part) | Base or other additives Type | Addition amount (part) | Dispersion time (hour) |
|---|---|---|---|---|---|---|---|---|
| Example 2-3 | Dispersion 3 | 8S | 2 | Dispersant 3 | 0.8 | NaOH | 0.2 | 8 |
| Example 2-4 | Dispersion 4 | 8S | 2 | Dispersant 4 | 0.8 | LiOH | 0.04 | 8 |
| Example 2-5 | Dispersion 5 | 8S | 2 | Dispersant 5 | 0.8 | KOH | 0.04 | 8 |
| Example 2-6 | Dispersion 6 | 8S | 2 | Dispersant 6 | 0.8 | $Mg(OH)_2$ | 0.04 | 8 |
| Example 2-7 | Dispersion 7 | 8S | 2 | Dispersant 7 | 0.8 | Choline | 0.04 | 8 |
| Example 2-8 | Dispersion 8 | 8S | 2 | Dispersant 8 | 0.8 | TMAH | 0.04 | 8 |
| Example 2-9 | Dispersion 9 | 8S | 2 | Dispersant 9 | 0.8 | NaOH | 0.04 | 8 |
| Example 2-10 | Dispersion 10 | 8S | 2 | Dispersant 10 | 0.8 | NaOH | 0.04 | 8 |
| Example 2-11 | Dispersion 11 | 8S | 2 | Dispersant 11 | 0.8 | — | — | 8 |
| Example 2-12 | Dispersion 12 | 8S | 2 | Dispersant 12 | 0.8 | NaOH | 0.04 | 8 |
| Example 2-13 | Dispersion 13 | 8S | 2 | Dispersant 13 | 0.8 | — | — | 8 |
| Example 2-14 | Dispersion 14 | 8S | 2 | Dispersant 14 | 0.8 | — | — | 8 |
| Example 2-15 | Dispersion 15 | 8S | 2 | Dispersant 15 | 0.8 | — | — | 8 |
| Example 2-16 | Dispersion 16 | 8S | 2 | Dispersant 16 | 0.8 | — | — | 8 |
| Example 2-17 | Dispersion 17 | 100T | 3 | Dispersant 1 | 0.6 | NaOH | 0.03 | 3 |
| Example 2-18 | Dispersion 18 | HS-100 | 20 | Dispersant 1 | 0.6 | NaOH | 0.03 | 1 |
| Comparative example 2-1 | Comparative dispersion 1 | 8S | 2 | H-NBR1 | 0.8 | — | — | 8 |
| Comparative example 2-2 | Comparative dispersion 2 | 8S | 2 | H-NBR1 | 0.8 | Aminoethanol | 0.4 | 8 |
| Comparative example 2-3 | Comparative dispersion 3 | 8S | 2 | PVP | 0.8 | NaOH | 0.04 | 8 |
| Comparative example 2-4 | Comparative dispersion 4 | 8S | 2 | PVP | 0.8 | — | — | 8 |
| Comparative example 2-5 | Comparative dispersion 5 | 8S | 2 | PVA | 0.8 | NaOH | 0.04 | 8 |

As shown in Table 3, each conductive material dispersion of the examples (Dispersions 1 to 18) has low viscosity and good storage stability. Comparative Dispersions 3 to 5 also have low viscosity and relatively good storage stability, whereas Comparative Dispersions 1 and 2 have high viscosity and poor storage stability. Similarly, the complex elastic modulus and the phase angle of each of Dispersions 1 to 18 are good, and the complex elastic modulus and the phase angle of Comparative dispersions 3 to 5 are relatively good. However, the complex elastic modulus and the phase angle of Comparison dispersions 1 and 2 are poor. In particular, the complex elastic modulus of Comparative Dispersion 1 is about 300 Pa, which is extremely poor.

TABLE 3

| Example Comparative example | Conductive material dispersion | Initial viscosity | Stability | Complex elastic modulus (Pa) | Phase angle (°) |
|---|---|---|---|---|---|
| Example 2-1 | Dispersion 1 | ◎ | ○ | ◎ | ◎ |
| Example 2-2 | Dispersion 2 | ◎ | ○ | ◎ | ◎ |
| Example 2-3 | Dispersion 3 | ○ | ○ | ○ | ○ |
| Example 2-4 | Dispersion 4 | ◎ | ○ | ◎ | ◎ |
| Example 2-5 | Dispersion 5 | ○ | ○ | ○ | ○ |
| Example 2-6 | Dispersion 6 | ○ | ○ | ○ | ○ |
| Example 2-7 | Dispersion 7 | ◎ | ○ | ◎ | ◎ |
| Example 2-8 | Dispersion 8 | ◎ | ○ | ◎ | ◎ |
| Example 2-9 | Dispersion 9 | ◎ | ○ | ◎ | ◎ |
| Example 2-10 | Dispersion 10 | ◎ | ○ | ◎ | ◎ |
| Example 2-11 | Dispersion 11 | ◎ | ○ | ◎ | ◎ |
| Example 2-12 | Dispersion 12 | ○ | ○ | ○ | ○ |
| Example 2-13 | Dispersion 13 | ◎ | ○ | ◎ | ◎ |
| Example 2-14 | Dispersion 14 | ○ | ○ | ○ | ○ |
| Example 2-15 | Dispersion 15 | ○ | ○ | ○ | ○ |
| Example 2-16 | Dispersion 16 | ◎ | ○ | ◎ | ◎ |
| Example 2-17 | Dispersion 17 | ◎ | ○ | ◎ | ◎ |
| Example 2-18 | Dispersion 18 | ◎ | ○ | ◎ | ◎ |
| Comparative example 2-1 | Comparative dispersion 1 | x | x | xx | x |
| Comparative example 2-2 | Comparative dispersion 2 | x | x | x | x |
| Comparative example 2-3 | Comparative dispersion 3 | Δ | ○ | ○ | Δ |
| Comparative example 2-4 | Comparative dispersion 4 | Δ | ○ | ○ | Δ |
| Comparative example 2-5 | Comparative dispersion 5 | Δ | ○ | ○ | Δ |

It is considered that the dispersant (Copolymer I) of the example has improved adsorptivity to the conductive material by introducing the amide group, and it is assumed that a conductive material dispersion having good dispersibility can be easily produced.

<Production of Mixture Slurry for Positive Electrode and Positive Electrode Film>

Example 3-1

According to the composition shown in Table 4, a conductive material dispersion (Dispersion 1) and 8 mass % of NMP having PVDF dissolved therein are added to a plastic container having a volume of 150 mL, and then the mixture is stirred with a rotation and revolution mixer (Awatori Rentaro manufactured by Thinky Co., Ltd., ARE-310) at 2,000 rpm for 30 seconds to obtain a binder resin-containing conductive material dispersion. Subsequently, NMC is added as an electrode active material, and the mixture is stirred with the rotation and revolution mixer at 2,000 rpm for 20 minutes. Then, NMP is added, and the mixture is stirred with the rotation and revolution mixer at 2,000 rpm for 30 seconds to obtain a mixture slurry for positive electrode. The solid content of the mixture slurry for positive electrode is 75 mass %.

The mixture slurry for positive electrode is coated on an aluminum foil functioning as a current collector and having a thickness of 20 μm by using an applicator, and is dried in an electric oven at 120° C.±5° C. for 25 minutes and adjusted so that the basis weight per unit area of the electrode is 20 mg/cm². Furthermore, rolling treatment with a roll press (manufactured by Thank-Metal Co., Ltd., 3t hydraulic type roll press) is performed, and a positive electrode film 1a in which the density of the positive electrode mixture layer is 3.1 g/cm³ is produced.

produced in the same manner as in Examples 3-1, 3-13 and Comparative examples 3-1 to 3-3, except that the electrode active material is changed to NCA.

Moreover, the abbreviations shown in Table 4 refer to the following.

NMC: NCM523 (manufactured by Nippon Chemical Industry Co., Ltd., composition: $LiNi_{0.5}Co_{0.2}Mn_{0.3}O_2$, solid content: 100%)

NCA: HED (registered trademark) NAT-7050 (manufactured by BASF Toda Battery Materials LLC, composition: $LiNi_{0.8}Co_{0.15}Al_{0.05}O_2$), solid content: 100%

PVDF: polyvinylidene fluoride (Solef #5130 (manufactured by Solvey Co., Ltd.), solid content: 100%)

TABLE 4

| Example Comparative example | Conductive material dispersion | Positive electrode active material | | Conductive material | | Dispersant | | PVDF |
|---|---|---|---|---|---|---|---|---|
| | | Type | Addition amount (part) | Type | Addition amount (part) | Type | Addition amount (part) | Addition amount (part) |
| Example 3-1 | Dispersion 1 | NMC | 98.1 | 8S | 0.30 | Dispersant 1 | 0.12 | 1.5 |
| Example 3-2 | Dispersion 2 | NMC | 98.1 | 8S | 0.30 | Dispersant 2 | 0.12 | 1.5 |
| Example 3-3 | Dispersion 3 | NMC | 98.1 | 8S | 0.30 | Dispersant 3 | 0.12 | 1.5 |
| Example 3-4 | Dispersion 4 | NMC | 98.1 | 8S | 0.30 | Dispersant 4 | 0.12 | 1.5 |
| Example 3-5 | Dispersion 5 | NMC | 98.1 | 8S | 0.30 | Dispersant 5 | 0.12 | 1.5 |
| Example 3-6 | Dispersion 6 | NMC | 98.1 | 8S | 0.30 | Dispersant 6 | 0.12 | 1.5 |
| Example 3-7 | Dispersion 7 | NMC | 98.1 | 8S | 0.30 | Dispersant 7 | 0.12 | 1.5 |
| Example 3-8 | Dispersion 8 | NMC | 98.1 | 8S | 0.30 | Dispersant 8 | 0.12 | 1.5 |
| Example 3-9 | Dispersion 9 | NMC | 98.1 | 8S | 0.30 | Dispersant 9 | 0.12 | 1.5 |
| Example 3-10 | Dispersion 10 | NMC | 98.1 | 8S | 0.30 | Dispersant 10 | 0.12 | 1.5 |
| Example 3-11 | Dispersion 11 | NMC | 98.1 | 8S | 0.30 | Dispersant 11 | 0.12 | 1.5 |
| Example 3-12 | Dispersion 12 | NMC | 98.1 | 8S | 0.30 | Dispersant 12 | 0.12 | 1.5 |
| Example 3-13 | Dispersion 13 | NMC | 98.1 | 8S | 0.30 | Dispersant 13 | 0.12 | 1.5 |
| Example 3-14 | Dispersion 14 | NMC | 98.1 | 8S | 0.30 | Dispersant 14 | 0.12 | 1.5 |
| Example 3-15 | Dispersion 15 | NMC | 98.1 | 8S | 0.30 | Dispersant 15 | 0.12 | 1.5 |
| Example 3-16 | Dispersion 16 | NMC | 98.1 | 8S | 0.30 | Dispersant 16 | 0.12 | 1.5 |
| Example 3-17 | Dispersion 17 | NMC | 97.9 | 100T | 0.50 | Dispersant 1 | 0.10 | 1.5 |
| Example 3-18 | Dispersion 18 | NMC | 95.4 | HS-100 | 3.00 | Dispersant 1 | 0.09 | 1.5 |
| Comparative example 3-1 | Comparative dispersion 1 | NMC | 98.1 | 8S | 0.30 | H-NBR1 | 0.12 | 1.5 |
| Comparative example 3-2 | Comparative dispersion 2 | NMC | 98.0 | 8S | 0.30 | H-NBR1 | 0.12 | 1.5 |
| Comparative example 3-3 | Comparative dispersion 3 | NMC | 98.1 | 8S | 0.30 | PVP | 0.12 | 1.5 |
| Comparative example 3-4 | Comparative dispersion 4 | NMC | 98.1 | 8S | 0.30 | PVP | 0.12 | 1.5 |
| Comparative example 3-5 | Comparative dispersion 5 | NMC | 98.1 | 8S | 0.30 | PVA | 0.12 | 1.5 |
| Example 4-1 | Dispersion 1 | NCA | 98.1 | 8S | 0.30 | Dispersant 1 | 0.12 | 1.5 |
| Example 4-2 | Dispersion 13 | NCA | 98.1 | 8S | 0.30 | Dispersant 13 | 0.12 | 1.5 |
| Comparative example 4-1 | Comparative dispersion 1 | NCA | 98.1 | 8S | 0.30 | H-NBR1 | 0.12 | 1.5 |
| Comparative example 4-2 | Comparative dispersion 2 | NCA | 98.0 | 8S | 0.30 | H-NBR1 | 0.12 | 1.5 |
| Comparative example 4-3 | Comparative dispersion 3 | NCA | 98.1 | 8S | 0.30 | PVP | 0.12 | 1.5 |

Examples 3-2 to 3-18, Comparative Examples 3-1 to 3-5

Positive electrode films 2a to 18a and comparative positive electrode films 1a to 5a are produced in the same manner as in Example 3-1, except that the type of the conductive material dispersion is changed.

Examples 4-1, 4-2, Comparative Examples 4-1 to 4-3

Figure 3:
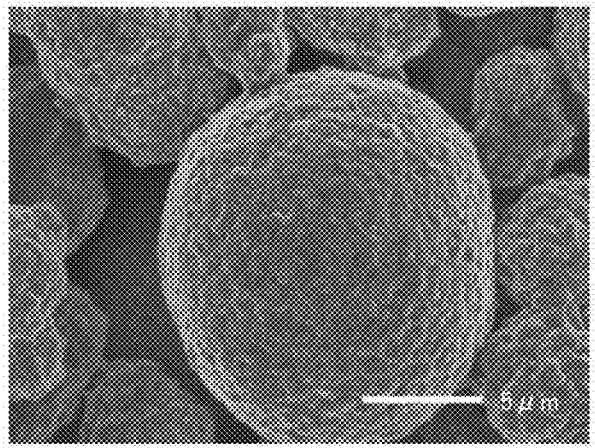
FIG. 3 is a photograph (1,000 times) of a positive electrode film 1a on the surface of a positive electrode film under a scanning electron microscope observation.
Figure 4:
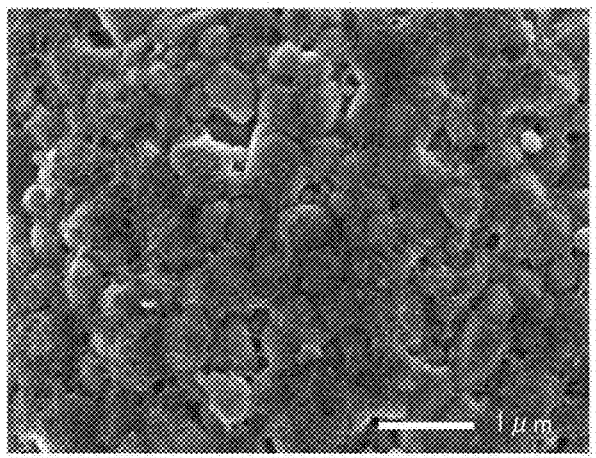
FIG. 4 is a photograph (enlargement, 5,000 times) of a positive electrode film 1a on the surface of a positive electrode film under a scanning electron microscope observation.
Figure 5:
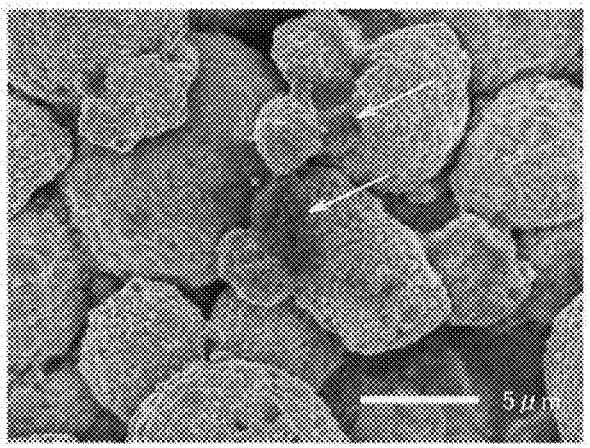
FIG. 5 is a photograph (1,000 times) of a comparative positive electrode film 3a on the surface of a positive electrode film under a scanning electron microscope observation.
Figure 6:
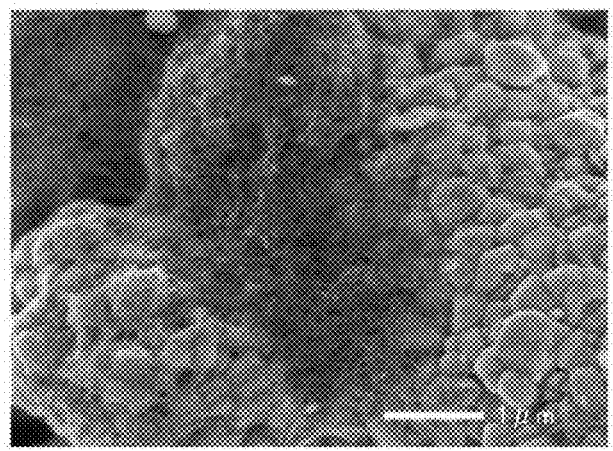
FIG. 6 is a photograph (enlargement 1, 5,000 times) of a comparative positive electrode film 3a on the surface of a positive electrode film under a scanning electron microscope observation.
Figure 7:
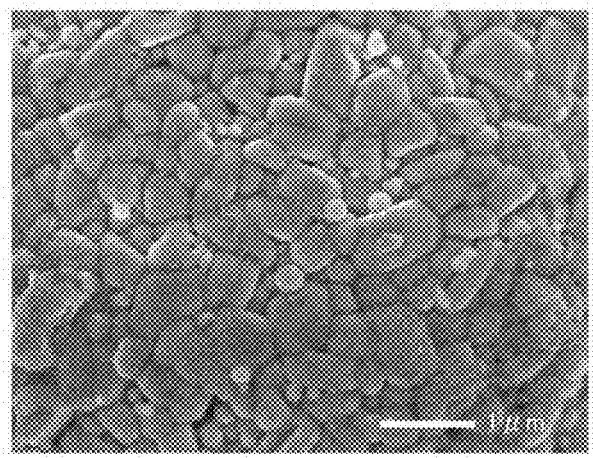
FIG. 7 is a photograph (enlargement 2, 5,000 times) of a comparative positive electrode film 3a on the surface of a positive electrode film under a scanning electron microscope observation.

As shown in Table 4, the positive electrode films 1b, 2b, and the comparative positive electrode films 1b to 3b are FIGS. 3 and 4 show SEM photographs of the positive electrode film 1a, and FIGS. 5 to 7 show SEM photographs of the comparative positive electrode film 3a. Spherical particles of several micrometers are the positive electrode active materials, and minute fibrous materials are CNTs. In the positive electrode film 1a, the CNTs do not aggregate independently (FIG. 3), and many CNTs are attached to the surface of the positive electrode active material particles (FIG. 4). On the other hand, in the comparative positive electrode film 3a, it is confirmed that the CNTs are aggregated independently in the gaps between the positive electrode active material particles at a plurality of locations (FIGS. 5 and 6), and almost no CNT is adhered to the surface of the positive electrode active material particles (FIG. 7).

Table 5 shows the evaluation results of the electrodes. In Table 5, the positive electrode film having an evaluation result of ◎ by SEM observation is in the same state as the positive electrode film 1a, and the comparative positive electrode film having an evaluation result of x is in the same state as the comparative positive electrode film 3a.

A comparison between the resistances and the results obtained by SEM observation shown in Table 5 shows that the correlation is very high. That is, it is considered that the positive electrode film of the example has good robustness, and accordingly the CNTs can efficiently form a conductive network, whereas the positive electrode film of the comparative example has poor robustness, and accordingly the conductive network cannot be formed and the resistance is deteriorated.

The inventors consider the difference in robustness as follows. It is considered that the dispersants used in Comparative examples 3-3 to 3-5 are well adsorbed and function not only on the conductive material but also on the positive electrode active material, thus the positive electrode active material which occupies most of the mixture slurry is deprived of the dispersant and a stable dispersion state cannot be maintained. Furthermore, in Comparative examples 4-1 to 4-3, poor robustness is particularly obvious. The reason is considered to be that in the case of a positive electrode active material having a high nickel ratio, the surface of the positive electrode active material particles has a high alkalinity, which greatly affects the maintenance of a stable dispersion state. It can be confirmed that positive electrode active materials having a high nickel ratio are becoming a trend due to expectations for higher output and/or higher capacity in recent years, and silicon-based negative electrode active materials, especially lithium-doped silicon-based negative electrode active materials, which are attracting attention for the same reason, have the same tendency.

In the examples, it is speculated that the adsorptivity of the dispersant is increased by containing an amide group, and a conductive material dispersion having good dispersibility is obtained. It is also speculated that a crosslinked structure is introduced into the copolymer being a dispersant by containing an amide group. It is considered that the dispersant used in the examples has a higher adsorptivity to the conductive material and the electrode active material particles as compared with common nitrile rubber, and has a high ability to disperse the conductive material and the electrode active material particles. In addition, the dispersant has a cross-linked structure that allows the dispersant to be adsorbed three-dimensionally on the conductive materials, thus achieving both dispersibility and robustness.

Furthermore, the dispersant used in the example is a copolymer prepared by a copolymer having a conjugated diene monomer unit. It is generally known that a copolymer having a conjugated diene monomer unit has a network-like molecular structure. It is speculated that a structural unit including a branch point is introduced as a part of the conjugated diene monomer unit into the copolymer, which is the dispersant used in the example, and the copolymer has a network-like molecular structure. It is considered that excellent dispersibility and robustness can also be achieved by the network-like molecular structure.

On the other hand, the dispersants of Comparative examples 2-1 to 2-2 (Comparative examples 4-1 to 4-2) which also have a network-like molecular structure have poor dispersibility, thus the dispersibility is poor when the dispersants are used as a conductive material dispersion, and a good conductive network cannot be formed in the electrode. Moreover, it has been found that the stronger the shear stress is applied in a mixing method, and the longer the mixing time is, the more likely the robustness failure occurs when the dispersant of the comparative example is used. The reason is considered to be that when the applied shear stress is stronger and the mixing time is longer, the electrode active material particles are deprived of the dispersant, or the entanglement between the conductive materials occurs, and the conductive materials aggregate with each other.

TABLE 5

| Example Comparative example | Positive electrode | Resistance | SEM | Example Comparative example | Battery | Rate characteristic | Cycle characteristic |
| --- | --- | --- | --- | --- | --- | --- | --- |
| Example 3-1 | Positive electrode 1a | ◎ | ◎ | Example 5-1 | Battery 1a | ◎ | ◎ |
| Example 3-2 | Positive electrode 2a | ◎ | ◎ | Example 5-2 | Battery 2a | ◎ | ◎ |
| Example 3-3 | Positive electrode 3a | ◎ | ◎ | Example 5-3 | Battery 3a | ◎ | ◎ |
| Example 3-4 | Positive electrode 4a | ◎ | ◎ | Example 5-4 | Battery 4a | ◎ | ◎ |
| Example 3-5 | Positive electrode 5a | ◎ | ◎ | Example 5-5 | Battery 5a | ◎ | ◎ |
| Example 3-6 | Positive electrode 6a | ○ | ◎ | Example 5-6 | Battery 6a | ○ | ◎ |
| Example 3-7 | Positive electrode 7a | ○ | ◎ | Example 5-7 | Battery 7a | ○ | ◎ |
| Example 3-8 | Positive electrode 8a | ◎ | ◎ | Example 5-8 | Battery 8a | ◎ | ◎ |
| Example 3-9 | Positive electrode 9a | ◎ | ◎ | Example 5-9 | Battery 9a | ◎ | ◎ |
| Example 3-10 | Positive electrode 10a | ◎ | ◎ | Example 5-10 | Battery 10a | ◎ | ◎ |
| Example 3-11 | Positive electrode 11a | ◎ | ◎ | Example 5-11 | Battery 11a | ◎ | ◎ |
| Example 3-12 | Positive electrode 12a | ○ | ◎ | Example 5-12 | Battery 12a | ○ | ◎ |
| Example 3-13 | Positive electrode 13a | ◎ | ◎ | Example 5-13 | Battery 13a | ◎ | ◎ |
| Example 3-14 | Positive electrode 14a | ◎ | ◎ | Example 5-14 | Battery 14a | ◎ | ◎ |
| Example 3-15 | Positive electrode 15a | ○ | ◎ | Example 5-15 | Battery 15a | ○ | ◎ |
| Example 3-16 | Positive electrode 16a | ○ | ◎ | Example 5-16 | Battery 16a | ○ | ◎ |
| Example 3-17 | Positive electrode 17a | ◎ | ◎ | Example 5-17 | Battery 17a | ◎ | ◎ |
| Example 3-18 | Positive electrode 18a | ◎ | ◎ | Example 5-18 | Battery 18a | ◎ | ◎ |
| Comparative example 3-1 | Comparative positive electrode 1a | X | X | Comparative example 5-1 | Comparative battery 1a | X | X |
| Comparative example 3-2 | Comparative positive electrode 2a | X | X | Comparative example 5-2 | Comparative battery 2a | X | X |
| Comparative example 3-3 | Comparative positive electrode 3a | X | X | Comparative example 5-3 | Comparative battery 3a | X | X |
| Comparative example 3-4 | Comparative positive electrode 4a | X | X | Comparative example 5-4 | Comparative battery 4a | X | X |

TABLE 5-continued

| Example Comparative example | Positive electrode | Resistance | SEM | Example Comparative example | Battery | Rate characteristic | Cycle characteristic |
|---|---|---|---|---|---|---|---|
| Comparative example 3-5 | Comparative positive electrode 5a | X | X | Comparative example 5-5 | Comparative battery 5a | X | X |
| Example 4-1 | Positive electrode 1b | ⊚ | ⊚ | Example 6-1 | Battery 1b | ⊚ | ⊚ |
| Example 4-2 | Positive electrode 2b | ⊚ | ⊚ | Example 6-2 | Battery 2b | ⊚ | ⊚ |
| Comparative example 4-1 | Comparative positive electrode 1b | X | X | Comparative Example 6-1 | Comparative battery 1b | X | X |
| Comparative example 4-2 | Comparative positive electrode 2b | X | X | Comparative Example 6-2 | Comparative battery 2b | X | X |
| Comparative example 4-3 | Comparative positive electrode 3b | X | X | Comparative Example 6-3 | Comparative battery 3b | X | X |

<Production of Non-Aqueous Electrolyte Secondary Battery>

Examples 5-1 to 5-18, Comparative Examples 5-1 to 5-5

Examples 6-1 to 6-2, Comparative Examples 6-1 to 6-3

The standard negative electrode shown below and the positive electrode film shown in Table 5 are punched into 50 mm×45 mm and 45 mm×40 mm, respectively, inserted into an aluminum laminated bag along with a separator (porous polypropylene film) inserted between the negative electrode and the positive electrode film and dried in an electric oven at 70° C. for 1 hour. Subsequently, 2 mL of an electrolytic solution is injected into a glove box filled with argon gas, then the aluminum laminated bag is sealed, and batteries 1a to 18a, batteries 1b to 2b, comparative batteries 1a to 5a, and comparative battery 1b to 3b are produced. The electrolytic solution is a non-aqueous electrolyte solution which is obtained by preparing a mixed solvent in which ethylene carbonate, dimethyl carbonate and diethyl carbonate are mixed at a ratio of 1:1:1 (volume ratio), then adding 1 part of VC (vinylene carbonate) as an additive to 100 parts of the electrolytic solution, and dissolving $LiPF_6$ at a concentration of 1M.

Manufacture Example 1 Production of Mixture Slurry for Standard Negative Electrode Acetylene black (manufactured by Denka Co., Ltd., Denka Black (registered trademark) HS-100), CMC, and water are added to a plastic container having a volume of 150 mL, and the mixture is stirred with a rotation and revolution mixer (Awatori Rentaro manufactured by Thinky Co., Ltd, ARE-310) at 2,000 rpm for 30 seconds. Furthermore, artificial graphite is added as a negative electrode active material, and the mixture is stirred with the rotation and revolution mixer (Awatori Rentaro manufactured by Thinky Co., Ltd, ARE-310) at 2,000 rpm for 150 seconds. Subsequently, SBR is added, and the mixture is stirred with the rotation and revolution mixer (Awatori Rentaro manufactured by Thinky Co., Ltd, ARE-310) for 30 seconds at 2,000 rpm to obtain a mixture slurry for standard negative electrode. The solid content of the mixture slurry for standard negative electrode is 48 mass %. The solid content ratio of the negative electrode active material, the conductive material, CMC and SBR in the mixture slurry for standard negative electrode is 97:0.5:1:1.5.

Moreover, the abbreviations described above refer to the following.

HS-100: Denka Black HS-100 (manufactured by Denka Co., Ltd., acetylene black, average primary particle diameter: 48 nm, specific surface area: 39 $m^2/g$)

Artificial graphite: CGB-20 (manufactured by Nippon Graphite Industry Co., Ltd.), solid content: 100%

CMC: #1190 (manufactured by Daicel FineChem Ltd.), solid content: 100%

SBR: TRD2001 (manufactured by JSR Co., Ltd.), solid content: 48%

Manufacture Example 2 Production of Standard Negative Electrode

The mixture slurry for negative electrode is coated on a copper foil functioning as a current collector and having a thickness of 20 μm by using an applicator, dried in an electric oven at 80° C.±5° C. for 25 minutes, and adjusted so that the basis weight per unit area of the electrode is 10 $mg/cm^2$. Furthermore, rolling treatment by a roll press (manufactured by Thank-Metal Co., Ltd., 3t hydraulic roll press) is performed, and a negative electrode in which the density of the negative electrode mixture layer is 1.6 $g/cm^3$ is produced.

<Results and Consideration of Rate Test and Cycle Test>

As shown in Table 5, the battery having good robustness has good rate characteristics and cycle characteristics, and the battery having poor robustness has bad rate characteristics and cycle characteristics. It is considered that the positive electrode film having a good conductive network and a low resistance has a low resistance as a battery and improves rate characteristics. In addition, when the conductive network is defective, the cycle load is concentrated on the electrode active material particles having a relatively low resistance and therefore accelerates the deterioration, whereas when a conductive network satisfactory as a whole is formed, the load is dispersed and it is less likely to deteriorate.

As described above, by achieving both dispersibility and robustness, a good dispersion state can be maintained in the electrode film to form an efficient conductive network, and a battery having good rate characteristics and cycle characteristics can be manufactured.

Although the present invention has been described with reference to the embodiments, the present invention is not limited to the above. Various changes that can be understood by those skilled in the art can be made to the configuration and details of the present invention within the scope of the present invention.

The disclosure of the present application relates to the subject matter described in Japanese Patent Application No. 2020-015256 filed on Jan. 31, 2020, the entire disclosure of which is incorporated herein by reference.

What is claimed is:

1. A copolymer, comprising:
an aliphatic hydrocarbon structural unit, a nitrile group-containing structural unit, and a substituted or unsubstituted carbamoyl group-containing structural unit,
wherein the aliphatic hydrocarbon structural unit comprises an alkylene structural unit, and
a content of the aliphatic hydrocarbon structural unit is 40 mass % or more and less than 85 mass % based on a mass of the copolymer, a content of the nitrile group-containing structural unit is 15 mass % or more and 50 mass % or less based on the mass of the copolymer, and a content of the substituted or unsubstituted carbamoyl group-containing structural unit is 10 mass % or less based on the mass of the copolymer.

2. The copolymer according to claim 1, wherein the copolymer further comprises a carboxyl group-containing structural unit of less than 1 mass % based on the mass of the copolymer.

3. The copolymer according to claim 1, wherein a weight-average molecular weight of the copolymer is 5,000 or more and 400,000 or less.

4. A composition, comprising:
the copolymer according to claim 1;
a base of 1 mass % or more and 20 mass % or less based on the mass of the copolymer; and
a solvent.

5. A conductive material dispersion comprising:
the copolymer according to claim 1; and
a conductive material.

6. The conductive material dispersion according to claim 5, wherein a complex elastic modulus is less than 20 Pa and a phase angle is 19° or more.

7. A binder resin-containing conductive material dispersion, comprising:
a binder resin different from the copolymer; and
the conductive material dispersion according to claim 5.

8. A slurry for electrode film, comprising:
the conductive material dispersion according to claim 5; and
an electrode active material.

9. An electrode film comprising at least one film selected from a group consisting of (i) a film formed by using the conductive material dispersion according to claim 5, (ii) a film formed by using a binder resin-containing conductive material dispersion comprising the conductive material dispersion and a binder, and (iii) a film formed by using a slurry for electrode film comprising the conductive material dispersion and an electrode active material, or the binder resin-containing conductive material dispersion and the electrode active material.

10. A non-aqueous electrolyte secondary battery, comprising:
a positive electrode;
a negative electrode; and
an electrolyte,
wherein at least one electrode selected from a group consisting of the positive electrode and the negative electrode comprises the electrode film according to claim 9.

11. A composition, comprising:
the copolymer according to claim 2;
a base of 1 mass % or more and 20 mass % or less based on the mass of the copolymer; and
a solvent.

12. A conductive material dispersion comprising:
the copolymer according to claim 2; and
a conductive material.

13. A binder resin-containing conductive material dispersion, comprising:
a binder resin different from the copolymer; and
the conductive material dispersion according to claim 6.

14. A slurry for electrode film, comprising:
the conductive material dispersion according to claim 6; and
an electrode active material.

15. An electrode film comprising at least one film selected from a group consisting of (i) a film formed by using the conductive material dispersion according to claim 6, (ii) a film formed by using a binder resin-containing conductive material dispersion comprising the conductive material dispersion and a binder, and (iii) a film formed by using a slurry for electrode film comprising the conductive material dispersion and an electrode active material, or the binder resin-containing conductive material dispersion and the electrode active material.

16. A non-aqueous electrolyte secondary battery, comprising:
a positive electrode;
a negative electrode; and
an electrolyte,
wherein at least one electrode selected from a group consisting of the positive electrode and the negative electrode comprises the electrode film according to claim 15.

* * * * *